United States Patent
Sandahl et al.

(10) Patent No.: US 10,709,919 B2
(45) Date of Patent: Jul. 14, 2020

(54) FIRE SUPPRESSION SYSTEMS AND METHODS

(71) Applicant: Tyco Fire Products LP, Lansdale, PA (US)

(72) Inventors: Derek M. Sandahl, Wallace, MI (US); Brian L. Counts, Menominee, MI (US); Marvin B. Fernstrum, Menominee, MI (US); Chad Ryczek, Oconto Falls, WI (US); Saul Escalante-Ortiz, Green Bay, WI (US); John T. Werth, Franklin, WI (US); Gregory J. Lilley, West Allis, WI (US); David R. Strehlow, Hales Corner, WI (US); Anthony J. Kreft, Oak Creek, WI (US); Thomas John Myers, Wauwatosa, WI (US); John S. Bushert, Brookfield, WI (US); Richard J. Hackl, Greendale, WI (US); Marvin D. Thorell, Racine, WI (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 16/112,373

(22) Filed: Aug. 24, 2018

(65) Prior Publication Data

US 2019/0175969 A1 Jun. 13, 2019

Related U.S. Application Data

(63) Continuation of application No. 14/430,176, filed as application No. PCT/US2013/061214 on Sep. 23, 2013, now abandoned.

(Continued)

(51) Int. Cl.
*A62C 37/00* (2006.01)
*A62C 35/02* (2006.01)
(Continued)

(52) U.S. Cl.
CPC ............ *A62C 37/00* (2013.01); *A62C 35/023* (2013.01); *A62C 35/64* (2013.01); *A62C 37/36* (2013.01);
(Continued)

(58) Field of Classification Search
CPC ....... A62C 35/023; A62C 37/36; A62C 37/00; B60R 16/02
(Continued)

(56) References Cited

U.S. PATENT DOCUMENTS 3,702,474 A 11/1972 Fink et al.
3,986,560 A 10/1976 Heath et al.
(Continued)

FOREIGN PATENT DOCUMENTS

EP 2 343 105 7/2011
GB 2 020 971 11/1979
(Continued)

OTHER PUBLICATIONS

Ansul® A-101 Fire Suppression System, Models 1 O, 20, 30 and Models 50, 125, 250, Data/Specifications, 2010, Tyco Fire Suppression & Building Products, 4 pages.
(Continued)

*Primary Examiner* — Mohammad Ali
*Assistant Examiner* — Joshua T Sanders
(74) *Attorney, Agent, or Firm* — Foley & Lardner LLP

(57) ABSTRACT

Fire suppression systems (10) for vehicles and industrial applications including arrangements of an input bus (24) and output bus (26) coupled to a centralized controller (20) to provide for automatic and manual detection of a fire (H) and
(Continued)

manual and automatic system actuation in response to the fire. The arrangements further provide for system information regarding the status and operation of the system components. Additionally, the arrangement of system components provide for expandability and programmability to configure the system for the protection of multiple and variable hazards (H) using customized or programmed detection and/or actuation. The systems include configured connectors (25) and colour coded schemes to facilitate system installation.

33 Claims, 15 Drawing Sheets

Related U.S. Application Data

(60) Provisional application No. 61/704,551, filed on Sep. 23, 2012, provisional application No. 61/794,105, filed on Mar. 15, 2013.

(51) Int. Cl.
  A62C 37/36 (2006.01)
  B60R 16/02 (2006.01)
  A62C 35/64 (2006.01)
  G05B 15/02 (2006.01)
  G05D 7/06 (2006.01)
  A62C 3/07 (2006.01)

(52) U.S. Cl.
  CPC .............. B60R 16/02 (2013.01); G05B 15/02 (2013.01); G05D 7/0635 (2013.01); A62C 3/07 (2013.01)

(58) Field of Classification Search
  USPC ......................................................... 700/283
  See application file for complete search history.

(56) References Cited

U.S. PATENT DOCUMENTS

| | | | |
|---|---|---|---|
| 3,993,138 A | 11/1976 | Stevens et al. |
| 4,034,470 A | 7/1977 | Patton et al. |
| 4,281,717 A | 8/1981 | Williams |
| 5,055,064 A | 10/1991 | Imaizumi et al. |
| 5,117,219 A | 5/1992 | Tice et al. |
| 5,236,049 A | 8/1993 | Asselin et al. |
| 5,273,443 A | 12/1993 | Frantz et al. |
| 5,486,811 A | 1/1996 | Wehrle et al. |
| 5,793,293 A | 8/1998 | Melamud et al. |
| 6,288,637 B1 | 9/2001 | Thomas et al. |
| 6,418,752 B2 | 7/2002 | Kotliar |
| D598,312 S | 8/2009 | Kreier et al. |
| D630,115 S | 1/2011 | Mizukami |
| D630,537 S | 1/2011 | Mizukami |
| D630,538 S | 1/2011 | Tokutake |
| D699,613 S | 2/2014 | Ke |
| D745,833 S | 12/2015 | Counts et al. |
| 2002/0036090 A1 | 3/2002 | Gil |
| 2003/0150625 A1 | 8/2003 | Smith et al. |
| 2003/0158635 A1 | 8/2003 | Pillar et al. |
| 2004/0145372 A1 | 7/2004 | Miyazaki |
| 2004/0163827 A1 | 8/2004 | Privalov et al. |
| 2005/0086863 A1 | 4/2005 | Brutsche et al. |
| 2007/0185625 A1 | 8/2007 | Pillar et al. |
| 2007/0256105 A1 | 11/2007 | Tabe |
| 2008/0215700 A1 | 9/2008 | Pillar et al. |
| 2008/0277125 A1 | 11/2008 | Wilkins et al. |
| 2010/0117840 A1 | 5/2010 | Rutter et al. |
| 2010/0237197 A1 | 9/2010 | Rosenfield et al. |
| 2010/0320021 A1 | 12/2010 | Rini et al. |
| 2011/0155397 A1 | 6/2011 | Icove et al. |
| 2011/0168416 A1 | 7/2011 | Frasure et al. |
| 2012/0132445 A1 | 5/2012 | Mallon et al. |
| 2014/0358455 A1 | 12/2014 | Rogers |
| 2015/0251031 A1 | 9/2015 | Sandahl et al. |

FOREIGN PATENT DOCUMENTS

| | | |
|---|---|---|
| GB | 2 405 514 | 3/2005 |
| WO | WO-2011/161792 | 12/2011 |
| WO | WO-2012/021549 A1 | 2/2012 |
| WO | WO-2012/021552 | 2/2012 |
| WO | WO-2014/047579 A1 | 3/2014 |
| WO | WO-2014/047574 | 6/2014 |

OTHER PUBLICATIONS

Ansul® Automatic Fire Suppression System (AFSS) Data/Specifications, 2012, Tyco Fire Products LP, 4 pages.

Electronics-Tutorials, "Signal Diodes", http://www.electronics-tutorials.ws/diode/diode_4.html (Website, archive snapshot Jan. 21, 2009), 4 pages.

Extended European Search Report, European Patent Application No. 13839904.3 dated Apr. 11, 2016, 37 pages.

Honeywell, "Extinguishing Agent Release Module: Operation, Installation & Programming Manual", May 10, 2010, 36 pages.

International Search Report and Written Opinion for International Application No. PCT/US2013/061214, dated Apr. 11, 2014, 19 pages.

International Search Report and Written Opinion for International Application No. PCT/US2013/061219, dated Feb. 6, 2014, 15 pages.

On All Cylinders Staff, "How to Diagnose Electrical Ground Issues", http://www.onallcylinders.com/2012/01/16/how-to-diagnose-electrical-ground-issues/ (Website), Jan. 16, 2012, 8 pages.

Safe Fire Detection Inc., "Linear Heat Detection", http://safefiredetection.com/products/linear-heat-detection/ (Website, archive snapshot May 6, 2012), 2 pages.

Wikipedia, "Current Limiting", Wikimedia Foundation, http://en.wikipedia.org/wiki/Current.limiting (Website, archive snapshot Feb. 25, 2008), 4 pages.

Wikipedia, "Voltage Divider", Wikimedia Foundation, http://en.wikipedia.org/wiki/Voltage_divider (Website, archive snapshot Aug. 1, 2012), 3 pages.

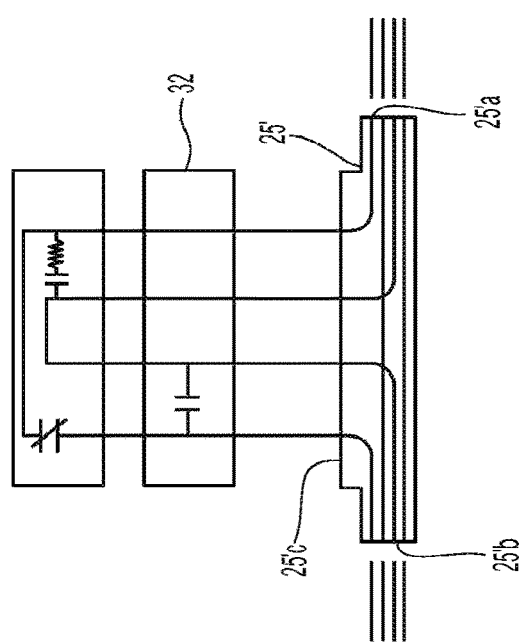
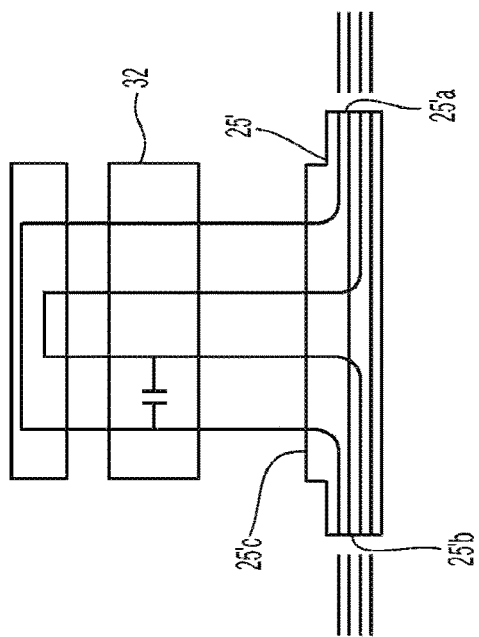

FIRE SUPPRESSION SYSTEMS AND METHODS

CROSS-REFERENCE TO RELATED PATENT APPLICATIONS

This application is a continuation of U.S. application Ser. No. 14/430,176, which is a National Stage of International Application No. PCT/US2013/061214, filed Sep. 23, 2013, which claims the benefit of U.S. Provisional Application No. 61/794,105, filed Mar. 15, 2013, and U.S. Provisional Application No. 61/704,551, filed Sep. 23, 2012. These applications are incorporated herein by reference in their entireties.

BACKGROUND OF THE INVENTION

Known vehicle fire suppression systems include the A-101 Fire Suppression System and the Automatic Fire Suppression System (AFSS), each from ANSUL®, a brand of Tyco Fire Protection Products. Data/Specification Sheets describing each of the known systems are attached as Exhibits to each of U.S. Provisional Patent Application Nos. 61/704,551 and 61/794,105.

DISCLOSURE OF THE INVENTION

The present invention is directed to a fire suppression system for vehicles and industrial applications. The preferred embodiments provide for arrangements of an input bus and output bus coupled to a centralized controller to provide for automatic and manual detection of a fire and manual and automatic system actuation in response to the fire. The preferred arrangements further provide for system information regarding the status and operation of the system components. Additionally, the preferred arrangements of system components provide for expandability and programmability to configure a system for the protection of multiple and variable hazards using customized or programmed detection and/or actuation. Moreover, the embodiments described herein facilitate system installation by using preferably configured connectors and color coded schemes.

The preferred system includes a fire fighting agent supply coupled to a one or more fixed nozzles to protect a hazard or area in which an ignition source and fuel or flammable materials may be found. The fire fighting agent supply preferably includes one or more storage tanks or cylinders containing the fire fighting agent, such as for example a chemical agent. Each storage tank cylinder includes a pressurized cylinder assembly configured for pressurizing the storage tanks for delivery of the agent under an operating pressure to the nozzles to address a fire in the hazard.

The pressurized cylinder assembly includes an actuating or rupturing device or assembly which punctures a rupture disc of a pressurized cylinder containing a pressurized gas, such as for example nitrogen, to pressurize the storage tank for delivery of the fire fighting agent under pressure. In order to operate the rupturing device, the system provides for automatic actuation and manual operation of the rupturing device to provide for respective automated and manual delivery of the chemical agent in response to a fire for protection of the hazard. The preferred rupturing device includes a puncturing pin or member that is driven into the rupture disc of the pressurized cylinder for release of the pressurized gas. The puncturing pin of the rupturing device may be driven electrically or pneumatically to puncture the rupture disc of the pressurized cylinder. A preferred device for driving the puncturing pin is a protracted actuation device (PAD), which includes an electrically coupled rod or member that is disposed above the puncturing pin. When an electrical signal is delivered to the PAD, the rod of the PAD is driven into the puncturing pin which punctures the rupture disc of the pressurized cylinder. The system provides for automatic and manual operation of the PAD, and more preferably provides for electric manual operation of the PAD.

The preferred system includes a preferably centralized controller for automated and manual operation and monitoring of the system. More specifically, the system includes a controller or interface control module (ICM) that is preferably coupled to a display device which displays information to a user and provides for user input to the ICM. To provide for fire detection and actuation of the pressurized cylinder assemblies and the fire protection system, the ICM is coupled to at least one input data communication bus for analog and digital devices and more preferably one or more detection devices which provide for automated or manual fire detection within the hazard. The ICM is also coupled to an output bus for communication with the PADs to initiate system actuation. The ICM is also coupled to an input power supply bus for powering the ICM and providing the power, detection, control and actuating signals respectively to the detectors of the input bus and PADs of the output bus.

The preferred input bus includes one or more digital fire detection devices and at least one manual actuating device. The fire detectors of the system can include analog and digital devices for various modes for fire detection including: (i) spot thermal detectors to determine when the surrounding air exceeds a set temperature, (ii) linear detection wire which conveys a detection signal from two wires that are brought into contact upon a separating insulation material melting in the presence of a fire, (iii) optical sensors which differentiate between open flames and hydrocarbon signatures, and (iv) a linear pressure detector in which pressure of an air line increases in the presence of sufficient heat. The actuating device is preferably a manual push button which sends an actuating signal to the controller for output of an electrical actuating signal to the PAD of the pressurized cylinder assembly. Accordingly, the preferred system provides for manual actuation of the system via an electrical signal to the PAD. The devices of the input bus may be interconnected by connection cable which may include one or more sections of linear detection wire. The connection cable of the input bus is coupled to the ICM. The detection devices may be digital devices for direct communication with the ICM. Alternatively, the detection devices may be analog devices which are coupled to a detection module for preferred digital communication with the ICM.

The ICM is preferably a programmable controller having a processor or microchip. The ICM may include an input device, i.e., a toggle switch or alternatively the ICM may be coupled to a separate user interface for program input, such as for example, the accompanying display device. Alternatively, the ICM may include wireless communication capabilities, a USB or other port for connection to a computer through which the program, system history, customized settings or firmware may be entered, uploaded or downloaded. In one preferred embodiment, the ICM can be configured to program the detection or actuating devices respectively disposed on the input and output buses. Exemplary device programming, for example, can set threshold levels and other parameters to provide for customized detection for a particular hazard. Accordingly, customized programming of the detection device can provide for protection of multiple and variable hazards.

The ICM preferably receives input signals on the input bus from the detection devices for processing and where appropriate, generating an actuating signal to the PAD along the output bus. Moreover, the processor is preferably configured for receiving feedback signals from each of the input and output buses to determine the status of the system and its various components. More specifically, the ICM may include internal circuitry to detect the status of the input bus, i.e., in a normal state, ground state, whether there is an open circuit, or whether there has been a signal for manual release. Alternatively or in addition to, detection modules can be configured with internal circuitry that communicates with the ICM to detect the status of the detection device, i.e., in a normal state, short circuit, ground state, open circuit, manual release and/or automatic release.

In one embodiment of the system, the actuating devices or PADs are coupled to the output bus for direct communication with the ICM. Accordingly, the internal circuitry of the preferred ICM can detect the status of the actuating device, e.g., ground fault. Alternatively, a releasing module may couple the PADs device to the ICM. The preferred releasing modules include internal circuitry so as to be individually identifiable or addressable by the ICM. The preferred releasing module can be further configured to couple multiple PADs to the ICM. Accordingly, the preferred releasing module can be used to expand the protection capability of the system by facilitating the addition of storage tanks and pressurized cylinder assemblies to protect the hazard or to protect additional hazard areas.

The releasing module and ICM can be configured individually or in combination to define a desired actuating sequence or pattern for actuating the PADs coupled to the releasing module. Accordingly, in one particular aspect, the releasing module and/or ICM is configured to provide for selective electrical actuation of multiple suppression devices including electrically actuating more than four or up to ten or more actuating devices or PADs. A preferred internal circuitry provides for sufficient current actuating pulse to the PADs, preferably 3 Amps at 24 volts and more preferably 3 Amps at 40 volts to supply sufficient energy to actuate multiple actuating devices or PADs. In addition, the internal circuitry can detect the status of the actuating device or PAD, for example, to determine if there is a ground fault.

The ability to interconnect and expand system components with a central controller over one or more input and output bus lines provides for fire suppression systems of varying complexity. In one particular embodiment, the system includes a controller, a first input bus with at least one fire detection device and at least one manual actuating device, the input bus provides for connecting analog and digital devices to the centralized controller. An output bus with at least one actuation device coupled to a pressurized cylinder for discharge of a fire fighting agent. In another embodiment, the system includes a controller, a first input bus, at least a second input bus with at least one fire detection device and at least one manual actuating device, and an output bus with at least one actuation device coupled to a pressurized cylinder for discharge of a fire fighting agent. Yet another embodiment provides for an input bus and an output bus with each bus including at least one programmable module coupled to the ICM for control of the devices along the input and output buses.

The preferred system includes a display interface device to monitor, operate and preferably program the ICM and the components disposed along the input and output buses. In one particular aspect, the display provides visual indication of the status of the input and output buses including, e.g., indication of: a normal state, ground state, open circuit, manual release. Moreover, the preferred display is coupled to the ICM to provide for programming and operational input. For example, the ICM includes visual indicators and/or visual displays that are coupled with user input devices, such as for example, push buttons, toggle switches, and/or directional buttons in order to scroll, select, edit, reset and/or input, etc. operational parameters of the system and its components. In one particular aspect, the interface display includes a manual actuating button to send an electrical actuating signal to the ICM to relay a corresponding manual electric actuation signal to the actuation device or PAD on the output bus. In another particular aspect, the interface display includes a display screen coupled to any one of a visual or audible alarm which indicates system problem requiring attention. The interface display further preferably includes a silence button to silence the alarm for a defined period of time, for example, two hours before the alarm notifies system personnel of an unresolved issue. Given the harsh environmental conditions around which the fire suppression system may be installed, the alarm is preferably constructed within the housing of the user interface display and is constructed to provide drainage in the presence of water or rain.

In one particular aspect, the visual indicators of the interface display include LEDs which indicate the status of system components using, for example, a binary indicator, i.e., on-off. Alternatively, the LEDs may use a color scheme to indicate the status of a system component, i.e., green—normal status, yellow—fault, red—open connection. In addition or alternatively, the interface display may use text and/or dynamic or static images to visually indicate the system status. For example, the display may use pictures or icons as the visual indicators.

A preferred embodiment of a vehicle fire suppression system includes a centralized controller; at least one input bus coupled to the centralized controller; at least one output bus to the centralized controller; at least one fire detection circuit including a plurality of fire detection devices and at least one manual actuating device. The fire detection circuit is coupled to the at least one input bus for monitoring of the fire detection circuit. At least one releasing circuit having at least one actuating device for electric and pneumatic release of an extinguishment is preferably coupled to the at least one output bus for monitoring of the releasing circuit. An alarm is preferably coupled to at least one controller for providing an audio signal indicting the status of the system along any one of the detection circuit and the releasing circuit. At least one user interface device is coupled to the centralized controller to program at least one of the plurality of detection devices or the at least one actuating device to define operational parameters including any one of threshold levels, time delays, or discharge sequences and patterns, the at least one user interface includes at least one LED indicator to indicate the status of the system including a normal status, a fire detection condition, and a release condition, the at least one user interface includes at least one toggle button to any one of input, select, edit, reset the operational parameters of the plurality of detection devices and the at least one actuating device. The at least one toggle button includes a manual actuating button for sending a manual actuating signal to the at least one actuating device and a silence button for the audio signal.

The components and more particularly the devices of the input bus are preferably interconnected by wire or cable. In one particular system embodiment, the connection cable carries control, power, data and/or sensing signals between the detection devices and the ICM. A preferred connector is provided for interconnecting segments of the connection cable so as to define a main bus of power for use by the devices of the input bus. One particular embodiment of a connector is substantially T-shaped having a first end, a second end and an intermediate connector end extending between the first and second end. The preferred connector includes at least one, and more preferably four internal wire(s), which extends from the first end to the intermediate connector and to the second end. With the first end of the connector coupled to an electrical signal defining an operating voltage, the internal wire of the preferred connector has the same voltage at each of its first, second and intermediate ends. Accordingly, connection wire coupled to the second end of the preferred connector receives the same input voltage as is provided at the first end of the connector. In another aspect, a device, such as for example, a sensing device may engage the intermediate connection end such that the device receives the signal at the same voltage that is provided at the first end of the connector. The preferred connector therefore provides main bus voltage along the length of the input bus.

In yet another aspect of the connection system, a color scheme is employed to facilitate proper interconnection between system components. For example, the ICM may include input ports configured with terminal connectors for engaging one or more connection cables of the input and/or output bus. The connection cable may include a colored connector at its end and the terminal connectors of the ICM may include correspondingly or similarly colored connectors for engaging the end of the connection cable. The use of one or more color schemes facilitates installation of the system and or prevents tampering or accidental disconnection.

BRIEF DESCRIPTION OF THE DRAWINGS

The accompanying drawings, which are incorporated herein and constitute part of this specification, illustrate exemplary embodiments of the invention, and, together with the general description given above and the detailed description and attachments given below, serve to explain the features of the invention.

FIGS. 10A-10C are schematic illustrations of an installed preferred cable connector.

DETAILED DESCRIPTION OF THE PREFERRED EMBODIMENTS

Figure 1:
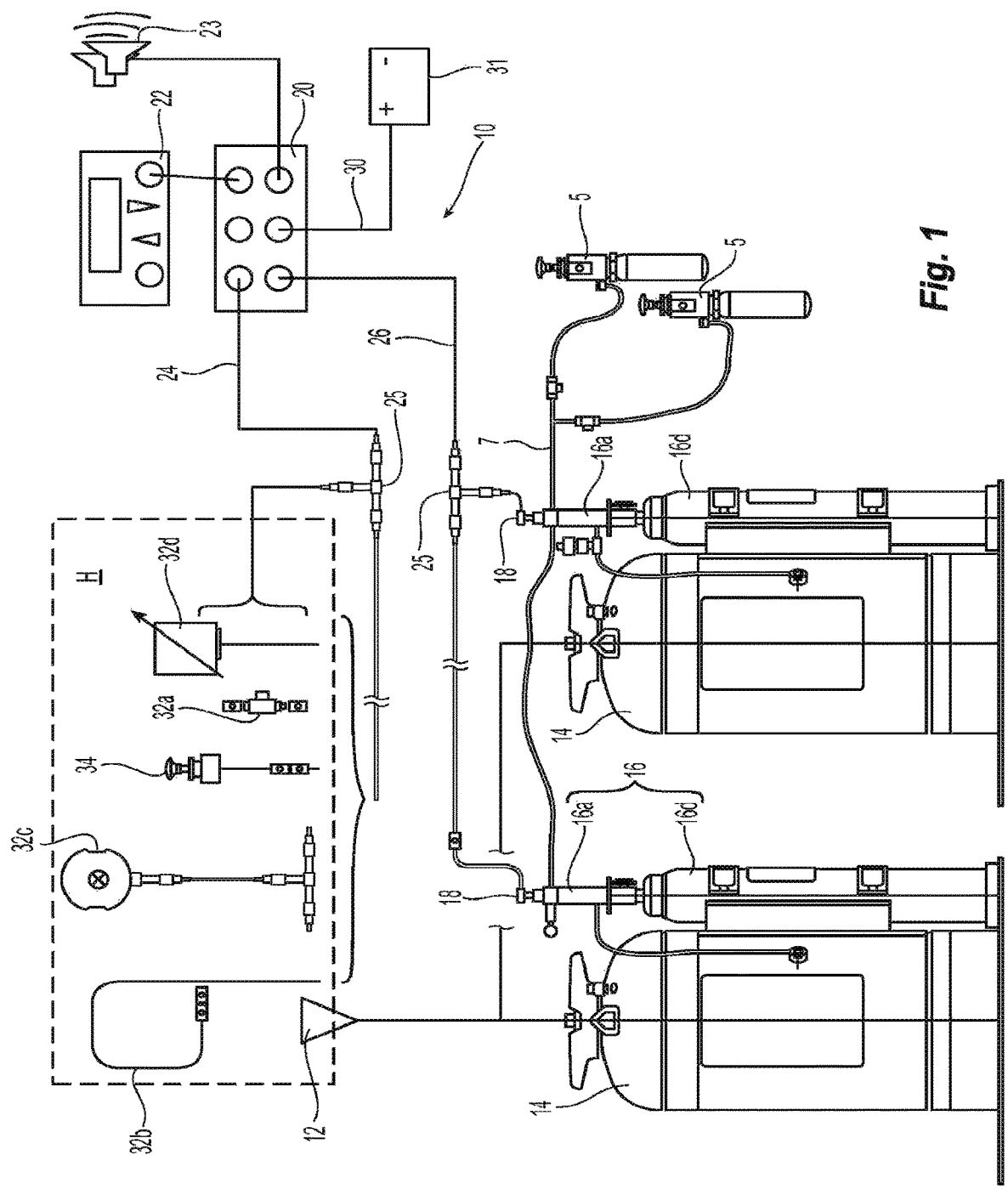
FIG. 1 is a schematic illustration of one embodiment of a fire suppression system.

FIG. 1 is a schematic illustration of a first embodiment of a suppression system 10 that includes a fire fighting agent supply coupled to a preferably fixed nozzle 12 to protect a hazard H or area in which an ignition source and fuel or flammable materials may be found. As shown, the fire fighting agent supply preferably includes one or more storage tanks or cylinders 14 containing the fire fighting agent, such as for example a chemical agent. Each storage tank 14 cylinder preferably includes a pressurized cylinder assembly 16 configured for pressurizing the cylinders 14 for delivery of the agent under an operating pressure to the nozzle 12 to address a fire in the hazard H. The preferred pressurized cylinder assembly 16 includes a rupturing device 16a which punctures a rupture disc of a pressurized cylinder 16b containing a pressurized gas, such as for example nitrogen, to pressurize the storage tank 14 for delivery of the fire fighting agent under pressure.

In order to operate the rupturing device 16a, the system 10 provides for automatic actuation and manual operation of the rupturing device 16a to provide for respective automated and manual delivery of the chemical agent in response a fire for protection of the hazard H. The preferred rupturing or actuating device or assembly 16a includes a puncturing pin or member that is driven into the rupture disc of the pressurized cylinder 16b for release of the pressurized gas. The puncturing pin of the rupturing device 16a may be driven electrically or pneumatically to puncture the rupture disc of the pressurized cylinder 16b.

The actuating device 16 preferably includes a protracted actuation device (PAD) 18 for driving the puncturing pin of the assembly into the rupture disc. The PAD 18 generally includes an electrically coupled rod or member that is disposed above the puncturing pin. When an electrical signal is delivered to the PAD 18, the rod of the PAD is driven directly or indirectly into the puncturing pin which punctures the rupture disc of the pressurized cylinder 16b. A preferred pressurized cylinder assembly is shown in Form No. F-95143-05 which is attached to U.S. Provisional Patent Application No. 61/704,551 and shows a known rupturing device for either manual and pneumatic or automatic electrical operation to drive a puncture pin. The system 10 provides for automatic and manual operation of the PAD 18. Unlike prior industrial/fire suppression systems having PADs and rupture discs, the preferred system 10 provides for electric manual operation of the PAD 18 as explained in greater detail below. The system 10 can further provide for one or more remote manual operating stations 5 to manually actuate the system. As is known in the art, the manual operating stations 5 can rupture a canister of pressurized gas, for example, nitrogen at 1800 psi, to fill and pressurize an actuation line which in turn drives the puncturing pin of the rupturing assembly 16*a* into the rupturing disc thereby actuating the system 10.

Figure 12:
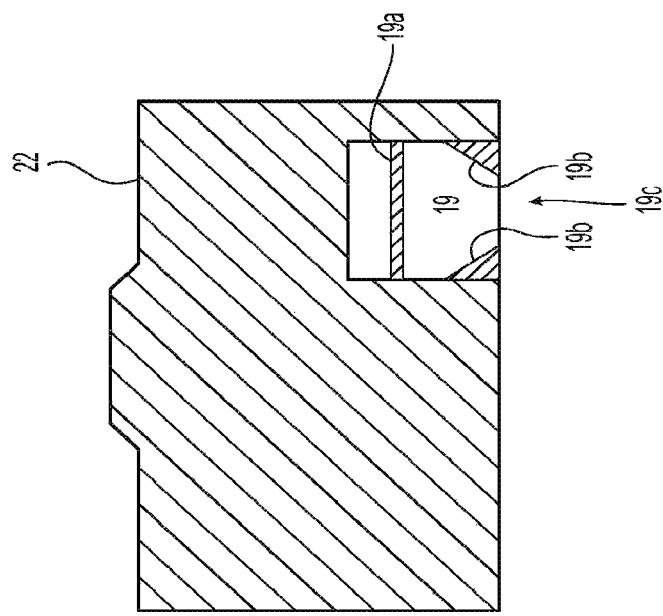
FIG. 12 is one preferred embodiment of an alarm sounder for use in the interface display devices of FIGS. 9A & 9B.

With reference to FIG. 1, the preferred system includes a preferably centralized controller for automated and manual operation and monitoring of the system 10. More specifically, the system 10 includes the centralized controller or interface control module (ICM) 20. Preferably coupled to the ICM 20 is a display device 22 which displays information to a user and a provides for user input to the ICM 20. An audio alarm or speaker 23 may also be coupled to the ICM 20 to provide for an audio alert regarding the status of the system 10. More preferably, an audio alarm or sounder is incorporated into the housing of the display device 22 and configured to operate in a wet environment. Shown in FIG. 12 is a representative image of a display device housing having a sounder chamber 19 separated by a sounding disc 19*a*. The interior of the chamber preferably includes an inclined or oblique surface to define one or more tapering walls 19*b* of the chamber 19 which lead to an opening 19*c* which permits drainage of any water or moisture while preferably maximizing alarm output. The sounder chamber 19 is preferably located along the housing such that moisture can drain from the chamber 19 when the display device housing is in its installed position.

To provide for fire detection and actuation of the cylinder assemblies 16 and the fire protection system, the ICM 20 further includes an input data bus 24 coupled to one or more detection sensors, an output data bus 26 coupled to the preferred PADs 18 and input power supply bus 30 for powering the ICM 20 and the control and actuating signals as explained in greater detail below. The input bus 24 preferably provides for interconnection of digital and analog devices to the ICM 20; and more preferably includes one or more fire detection devices 32 and preferably at least one manual actuating device 34. The fire detection devices 32 of the system 10 can include analog and digital devices for various modes for fire detection including: (i) spot thermal detectors 32*a* to determine when the surrounding air exceeds a set temperature, (ii) linear detection wire 32*b* which conveys a detection signal from two wires that are brought into contact upon a separating insulation material melting in the presence of a fire, (iii) optical sensors 32*c* which differentiate between open flames and hydrocarbon signatures, and (iv) a linear pressure detector 32*d* in which pressure of an air line increases in the presence of sufficient heat. Examples of the detection devices are shown and described in which is attached to U.S. Provisional Patent Application No. 61/704,551. The manual actuating device 34 is preferably a manual push button which sends an actuating signal to the ICM 20 for output of an electrical actuating signal along to the PAD 18 of the pressurized cylinder assembly 16. Accordingly, the preferred system provides for manual actuation of the system via an electrical signal to the PAD. Together the detection and manual actuating devices 32, 34 define a detecting circuit of the system 10 of either an automatic or manual detection of a fire event.

Figure 1A:
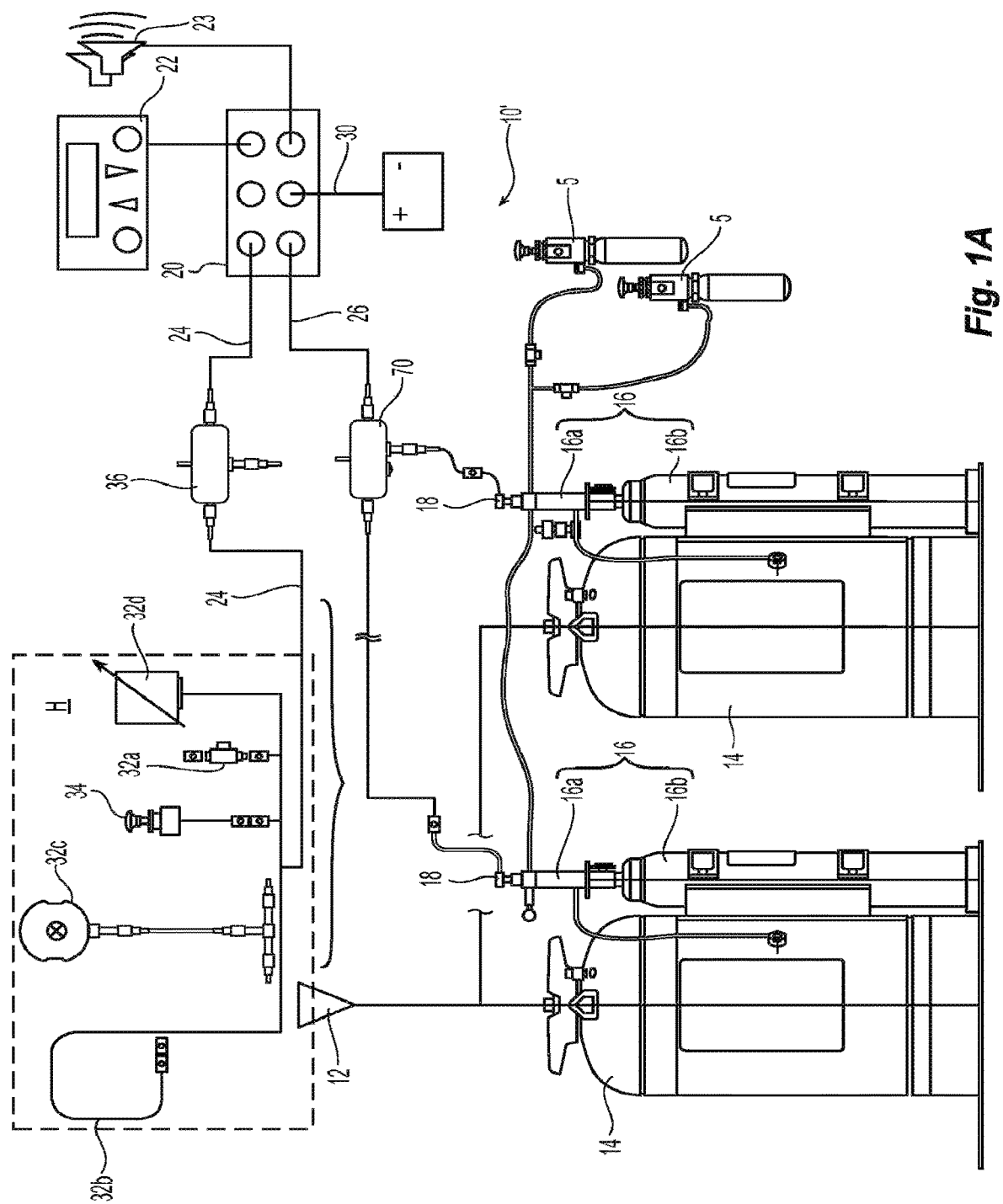
FIG. 1A is a schematic illustration of another embodiment of a fire suppression system.

The devices 32, 34 of the input bus 24 may be interconnected by two or more interconnected connection cables which may include one or more sections of linear detection wire 32*b*. The cables are preferably connected by connectors 25. The connection cable of the input bus 24 is coupled to the ICM. The connection cables of the input and output buses 24, 26 preferably define closed electrical circuits with the ICM 20. Accordingly, a bus may include one or more branch terminators, for example, at the end of a linear detection wire. Additionally, the detecting circuit can include an end of line element which terminates the physically furthest end of the input bus, for example, and monitors the detecting circuit of the system 10. The detection devices 32, 34 may be digital devices for direct communication with the ICM as seen in FIG. 1. Alternatively, the detection devices may be analog devices which are coupled to one or more detection modules 36 for preferred digital communication with the ICM as schematically shown in FIG. 1A.

Referring again to FIG. 1, the ICM 20 is preferably a programmable controller having a microprocessor or microchip. The ICM preferably receives input signals on the input bus 24 from the detection devices 32 for processing and where appropriate, generating an actuating signal to the PAD along the output bus 26. Moreover, the processor is preferably configured for receiving feedback signals from each of the input and output buses to determine the status of the system and its various components. More specifically, the ICM may include internal circuitry to detect the status of the input bus, i.e., in a normal state, ground state, whether there is an open circuit, or whether there has been a signal for manual release.

Figure 2:
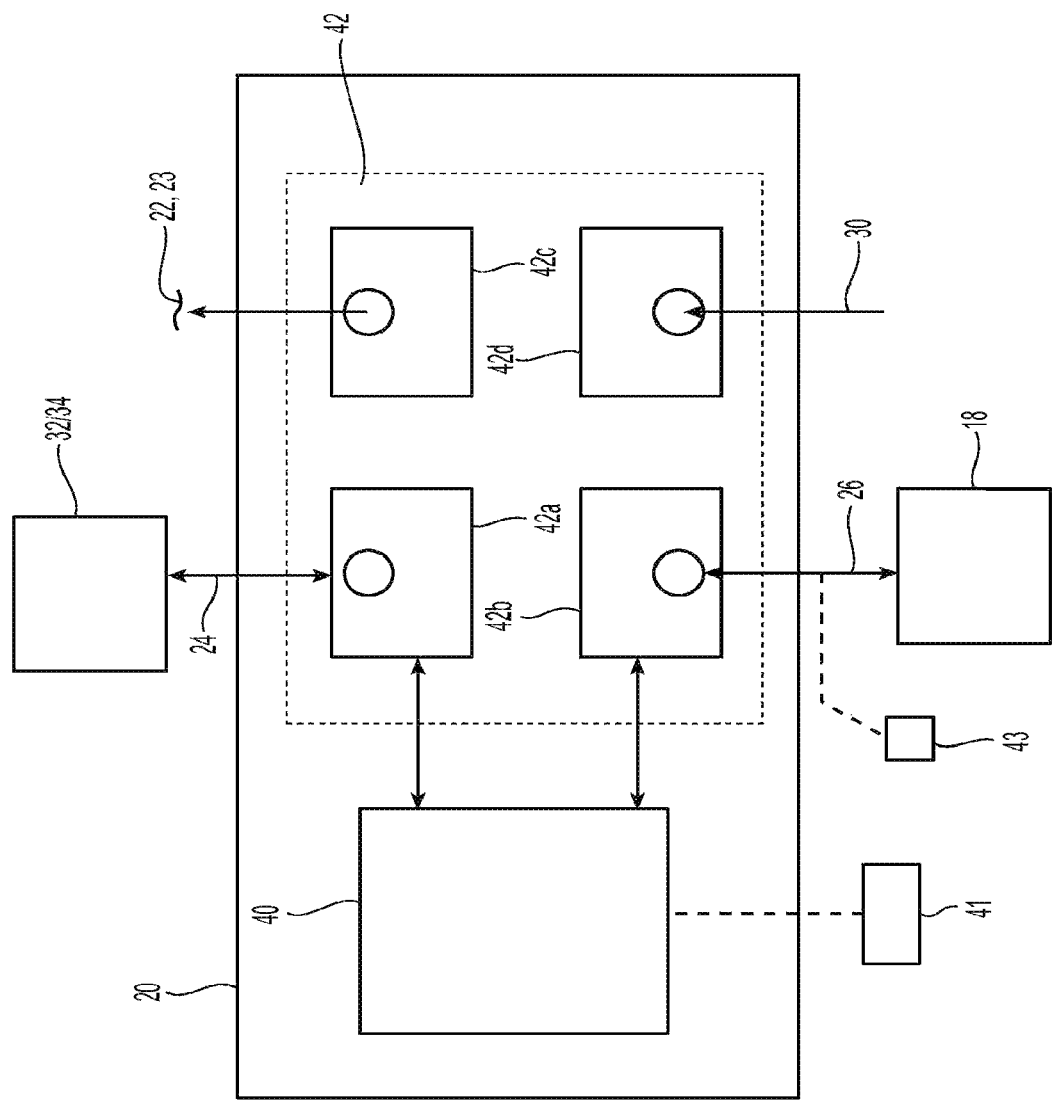
FIG. 2 is a schematic illustration of one embodiment of a centralized controller in the system of FIG. 1.

Shown schematically in FIG. 2 is the ICM 20 and its internal components coupled with detection devices 32, 34 along input data bus 24 and with PAD 18 along output data bus 26. In one embodiment of the ICM 20, the internal components preferably include a microprocessor 40 coupled to internal circuitry 42 having a first portion 42*a* coupled to the input data bus 24, second portion 42*b* coupled to the output data bus 26, a third portion 42*c* for output to the display and/or audio devices 22, 23 and a fourth portion 42*d* of internal circuitry 42 coupled to the power bus 30 for receiving power from the power supply.

In one preferred aspect of the system, the ICM 20 and its internal components are configured to monitor the status of the input data bus and the detection devices 32, 34. More specifically, the ICM 20 and its internal components can be configured to determine whether the input data bus 24 and the associated components have experienced a fault condition due to either environmental conditions such as, for example, vibration, moisture or wear. Moreover, the internal components of the ICM 20 can be configured with a monitoring circuit in its internal circuitry to discern whether the input data bus 24 and its associated devices 32, 34 are in any one of a: (i) normal state; (ii) a sensed or automated detection state; and/or (iii) a manual release detection state (manual actuation). In addition, the internal circuitry provides for a deadzone or unused range of voltage/resistance to discern from an automatic or sensed detection from a detection device 32 or a manual release detection from a manually operated actuating device 34.

Figure 3:
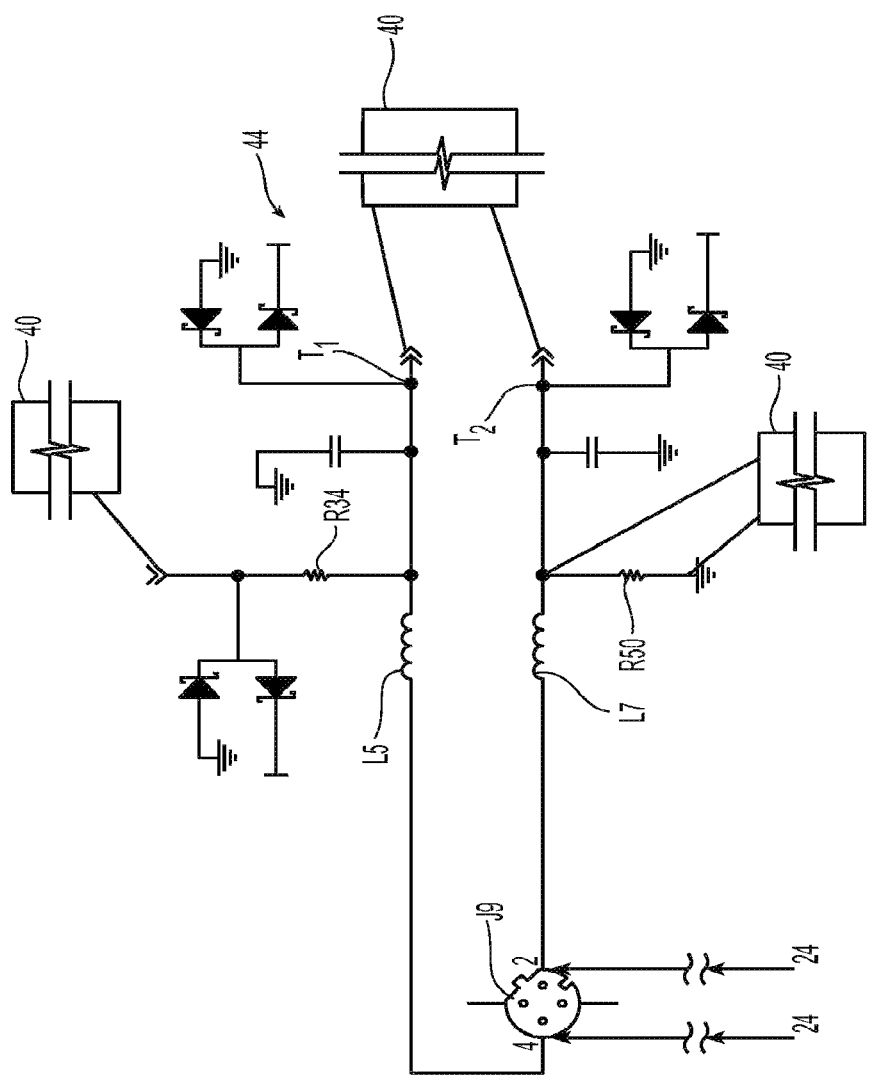
FIG. 3 is one embodiment of a fault detection circuit used in the controller of FIG. 2.

With reference to FIG. 2, the first portion 42*a* of the internal circuitry of the ICM 20 defines in part or whole the preferred fault detection circuit 44 in combination with the microprocessor 40 for the input bus 24 and the associated components 32,34. Shown in FIG. 3 is a preferred monitoring circuit 44 for the first portion 42*a* of the internal circuit. The monitoring circuit 44 includes a first resistor R34, a first inductor L5, a mini DIN connector J9, a second inductor L7 and a second resistor R50 coupled to ground. Coupled to the mini DIN J9 is the input bus 24 at pins 4 and 2. In detecting a fault, a sensing current, preferably about 200 microamps (200 μA) is sent through the first resistor R34, the first inductor L5, out pin 4 of the mini-DIN through the input bus 24 and its devices 32, 34 and back through the mini-DIN J9 at pin 2, through the second inductor L,7 and through the second resistor R50. The microprocessor 40 evaluates the voltage across second resistor R50 to determine if there is a fault in the input bus 24 and associate devices. If it is determined that there is a voltage across second resistor R50 then there is no fault. If there is no voltage across second resistor R50, then there is a fault. To determine as to whether or not the fault is a ground fault, i.e., wire in contact with the vehicle chassis or an open circuit, the microprocessor 40 evaluates the voltage at each of the first terminal T1 and second terminal T2 of the monitoring circuit. From the voltage differential, the microprocessor 50 determines a resistance value across the terminals T1, T2 which define the state of the detection circuit defined by the input bus 24 and its associated devices 32, 34. In one particular embodiment, if the state of the detection circuit 24, 32, 34 is defined by the following resistance values (ohms), measured at T1, T2: (i) 350-500 ohms and 700-10,000 ohms=normal state; (ii) 0-350 ohms=a sensed or automated detection state; (iii) 500-700 ohms=a manual release detection state (manual actuation); and (iv) greater than (>) 10,000 ohms=an open circuit. Accordingly, the range of resistance at 350-500 ohms defines a non-state or deadzone for the monitoring circuit 44 to create a gap between the sensed and manual released detection resistance values so that the system can distinguish between the two states. The preferred open circuit range of greater than 10,000 ohms is defined by a preferred total system wire length and resistance providing an equivalent resistance of about ohms. Accordingly, the open circuit range can be alternatively configured so long as it accounts for the equivalent resistance of the system. The sensing current is preferably taken from the power bus 30. Where the system 10 is a vehicle fire suppression system, in order to properly detect a ground fault state, the ground is power supply coupled to the power bus is preferably referenced or grounded to the vehicle chassis.

Figure 4:
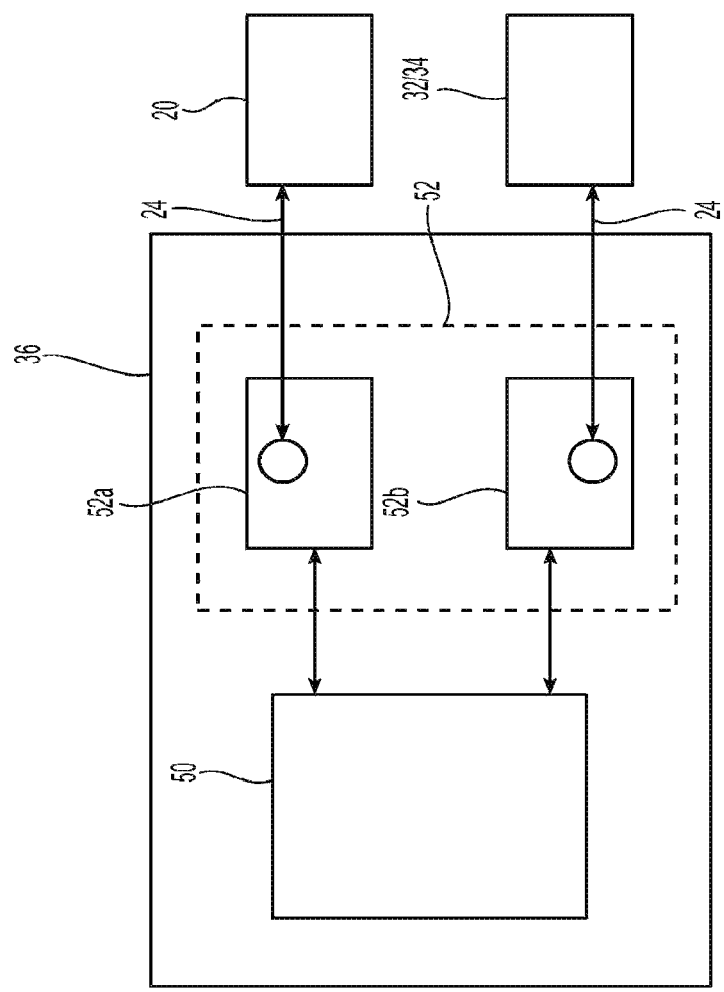
FIG. 4 is a schematic illustration of one embodiment of a detection module used in the system of FIG. 1A.

With reference to FIG. 1A, and the alternate embodiment of the system 10' having detection modules 36 disposed between the detection devices 32, 34 and the ICM 20, the detection modules 36 can be configured with internal circuitry that communicates with the ICM to detect a fault state in the detection circuit defined by the input data bus 24 and the associated devices 32, 34. Shown in FIG. 4 is a schematic illustration of the internal components of one embodiment of a detection module 36. The detection module 36 preferably includes its own microprocessor 50 and associated internal circuitry 52. The internal circuitry 52 preferably includes a first portion 52 as in communication with the ICM 20 via the input bus 24. Additionally, the internal circuitry has a second portion 52b in communication with one or more of the detection devices 32, 34. Moreover, the second portion 52b of the internal circuit preferably includes a monitoring circuit that works in conjunction with the detection module processor 50 to detect a fault within the input data buses and associated detection devices 32, 34. More preferably, the monitoring circuit is configured as the monitoring circuit 44 previously described and shown in FIG. 3 with the microprocessor 50 measuring and processing the voltages across detection resistor 50 and terminal ends T1, T2 to determine the state of the detection circuit. The detected status or feedback from the fault detection circuit, as defined by the detected resistance in the detection resistor R50, can be communicated from the detection module 36 to the ICM 20 over the input 24 for display to the operator at display device 22.

Referring again to FIG. 1, the output bus 26 and the actuating devices or PADs 18 in combination with the ICM 20 preferably define the releasing circuit of the system 10. As with the detection side, it is desirable to detect faults and more particularly ground faults, in the releasing circuit that may have come about due to environmental conditions, such as for example, vibration, moisture or wear. In one embodiment of the system, the actuating devices or PADs 18 are coupled to the output bus 26 for direct communication with the ICM. Accordingly, the internal circuitry of the preferred ICM can detect the status of the actuating device, e.g., ground fault.

Referring again to FIG. 2, shown is a schematic illustration of the ICM 20 including its microprocessor 40 and associated internal circuitry having a second portion 42b in communication with the PADs 18 of the system 10 over the output data bus 26. To provide for ground fault detection in the releasing circuit defined by output bus 26 and PADs 18, the second portion 42b of the internal circuit define in whole or part, a preferred ground fault monitoring circuit.

Figure 3A:
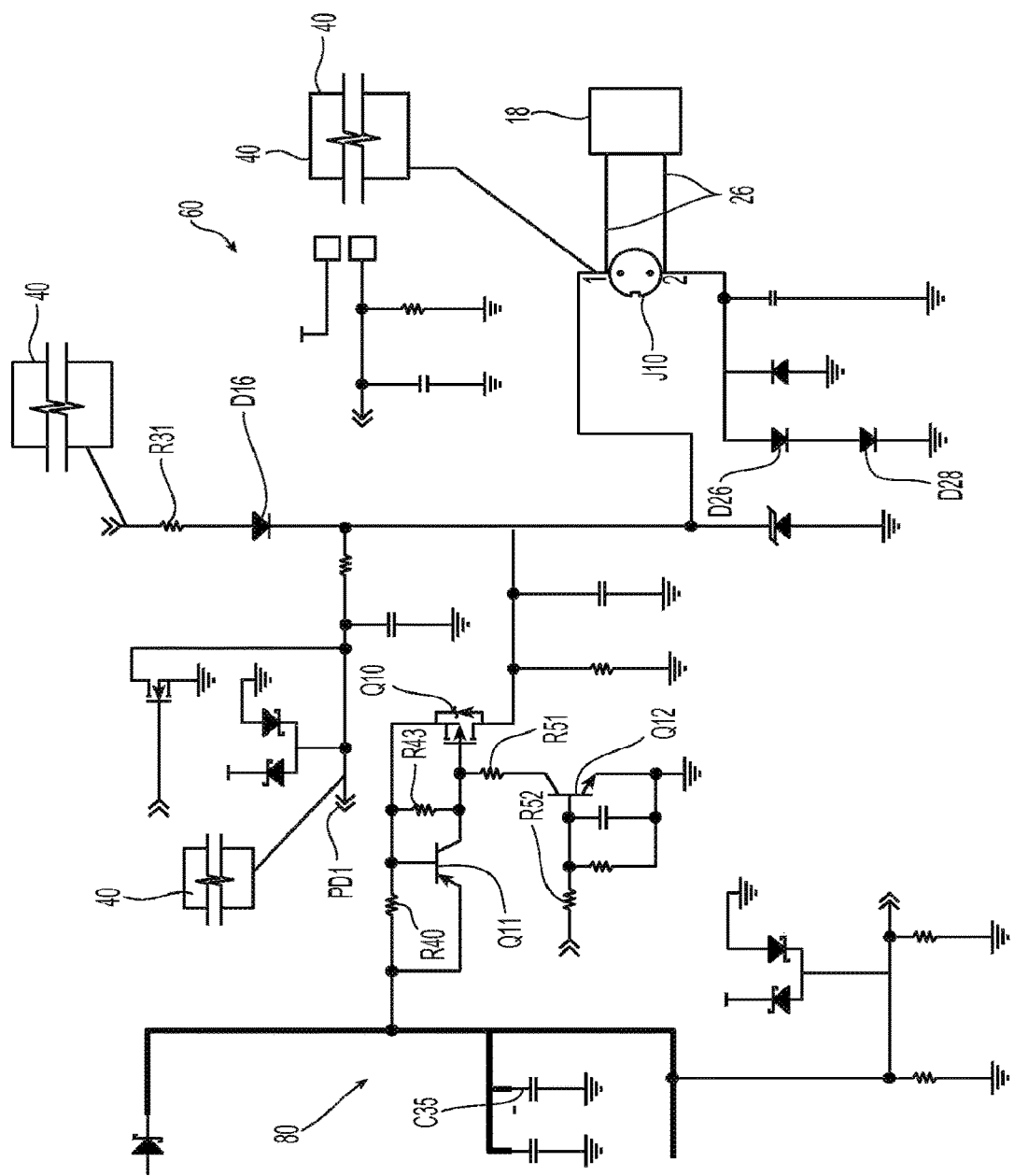
FIG. 3A is another embodiment of a fault detection circuit used in the controller of FIG. 2.

Shown in FIG. 3A is a preferred ground fault detection circuit 60 for the release circuit of the system 10. The ground fault detection circuit 60 preferably includes a first resistor R31, a first diode D 16, a mini DIN connector J10, a second diode D26 and a third diode D28 in series with the second diode D26 and coupled to ground. Coupled to the mini DIN J10 is the output bus 26 at pins 1 and 2. In starting ground fault detection, a sensing current, preferably from the power source bus 30 is initiated by processor 40 by applying a voltage differential across first resistor R31. In one embodiment, the initiating voltage ("Pullup_Enable") is equivalent to a reference voltage established by an A/D converter reading the voltage ("PAD_Detect") at terminal PD1 by processor 40, which detects a PAD 18 of the system. The initiated current flows through resistor R31 and first diode D16, out through mini DIN J10 at pin 1, through the PAD(s) 18, back into the monitoring circuit through pin 2 of the mini-DIN J10, then through second and third diodes D26, D28 to circuit ground. If there is no ground fault in the releasing circuit defined by the output bus 26 and PAD(s) 18, current will flow through second and third diodes D26, 28; and as a result, a voltage of a few hundred millivolts is detectable at pin 1 of the mini DIN J10. Accordingly, the microprocessor 40 of the ICM 20 is preferably configured to monitor the voltage at pin 1 of the mini DIN J10. When the microprocessor 40 of the ICM 20 determines that there is only background noise voltage and substantially no voltage at pin 1 due to the lack of current flow at the first and second diodes D26, D28, the ground fault detection circuit 60 and ICM can indicate a ground fault in the releasing circuit of the system 10. In one aspect of the preferred ground fault detection circuit 60 for a vehicle suppression system, the power source providing the sensing current is preferably grounded or referenced to the vehicle chassis. Accordingly, a ground fault condition is defined by a wire of the PAD 18 contacting the vehicle chassis such that current flowing through the ground fault detection circuit 60 travels through the chassis instead of the first and second diodes D26, D28 because current flow through the chassis or ground is the path of least resistance.

Alternatively to coupling the PADs 18 for direct communication with the ICM 20, a releasing module may couple the PAD devices 18 to the ICM 20. With reference to FIG. 1A, and the alternate embodiment of the system 10' having releasing modules 70 disposed between the detection devices 32, 34 and the ICM 20, the releasing modules 70 can be configured with internal circuitry that communicates with the ICM to detect a ground fault in the releasing circuit defined by the output data bus 24 and the associated actuating devices 18. The preferred releasing module 70 can couple a single PAD 18 to the ICM 20 or alternatively couple multiple PADs 18 to the ICM. Accordingly, the preferred releasing module 70 can be used to expand the protection capability of the system by facilitating the addition of storage tanks and pressurized cylinder assemblies to protect the hazard or to protect additional hazard areas.

Figure 5:
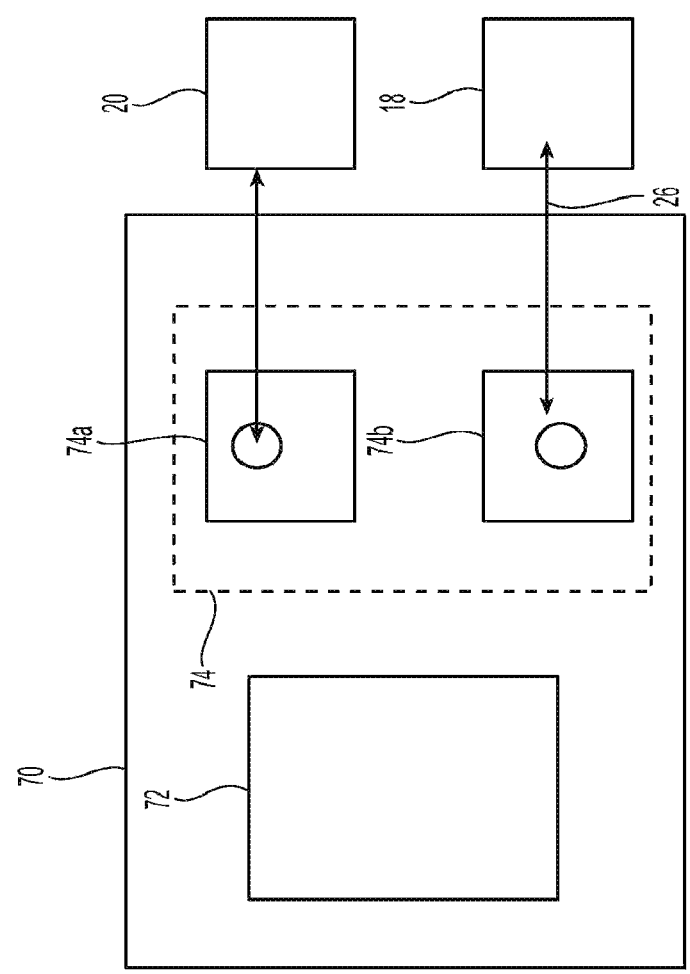
FIG. 5 is a schematic illustration of one embodiment of a releasing module used in the system of FIG. 1A.

Moreover, the releasing module 70 can be configured with a ground fault monitoring circuit, such as for example, ground fault detection circuit 60 previously described to determine if any PAD 18 coupled to the releasing module 70 has a ground fault. Shown in FIG. 5 is a schematic illustration of the internal components of one embodiment of a releasing module 70. The releasing module 70 preferably includes its own microprocessor 72 and associated internal circuitry 74. The internal circuitry 74 preferably includes a first portion 74a in communication with the ICM 20 via the output data bus 26. Additionally, the internal circuitry has a second portion 74b in communication with one or more of the actuation devices or PADs 18. Moreover, the second portion 74b of the internal circuit preferably includes a monitoring circuit that works in conjunction with the releasing module processor 72 to detect a ground fault within the output data bus 26 and associated actuation devices 18. More preferably, the monitoring circuit is configured as the monitoring circuit 60 previously described and shown in FIG. 3A with the microprocessor 50 measuring and processing the voltages at pin 1 of the mini-DIN J10 to determine the state of the releasing circuit. The detected status or feedback from the ground fault detection circuit 60 can be communicated from the releasing module 70 to the ICM 20 over the output bus 26 for display to the operator at display device 22.

The preferred detection and releasing modules 36, 70 include internal circuitry so as to be individually identifiable or addressable by the ICM 20 for communication and/or system programming. Moreover, the releasing module can be configured to define a desired actuating sequence or pattern for actuating the PADs coupled to the releasing module. Accordingly, in one particular aspect, the releasing module is configured to provide for selectively firing multiple suppression devices including up to actuating up to about ten actuating devices or PADs. The preferred releasing module includes internal circuitry which provides for sufficient current, preferably 3 Amps at 24 volts to supply sufficient energy to actuate the multiple actuating devices or PADs. In addition, the internal circuitry of the preferred ICM can detect the status of the actuating device or PAD, for example, to determine if there is a ground fault.

The systems 10 include multiple storage tanks 14 and pressurized cylinder assemblies 16 for their actuation. The system 10 is preferably configured with the plurality of pressurized cylinder assemblies daisy chained in series with the releasing circuit configured to electrically actuate each pressurized cylinder assembly 16 in the chain. To address the current requirements for such a configuration, the preferred suppression system 10 includes an actuating circuit to provide high current for electrically actuating more than one cylinder assembly 16, and more preferably more than four pressurized cylinder assemblies 16 interconnected along the output bus 26, which define the releasing circuit of the system 10. The actuating circuit preferably actuates five pressurized cylinder assemblies in series, and more preferably actuate as many as ten (10) and even more preferably more than ten pressurized cylinder assemblies 16 in series. Generally, the preferred high current circuit includes a capacitor that stores current during an unactuated state of the system 10, and discharges the stored current preferably as a current pulse to actuate more than four PADs 18 and more preferably up to ten PADs 18. The actuation of the PADs may be simultaneous or alternatively sequential. The high current actuating circuit preferably provides 3 Amps at 24 Volts for actuating the PADs 18 of the releasing circuit of the system 10. Alternatively or in addition to, the actuating circuit preferably provides 3 Amps at 40 Volts for actuating the PADs 18 of the releasing circuit of the system 10.

The actuating circuit 80 may further include a crow bar circuit as is known in the art to monitor, control and/or limit the release of the preferred stored voltage in order such that the actuating current pulse is sufficiently high to actuate the pressurized cylinder assemblies 16; yet sufficiently low to permit the use of connection cable of the output bus 26 having a length of 250 feet or more. Minimizing the current pulse through the output bus 26 permits the use of lower gauge wire of the interconnecting cable lengths of 250 feet or more. The actuating circuit may further include a monitoring circuit to monitor the magnitude of the current pulse.

Again, each PAD 18 is preferably configured to receive a current pulse which drives its rod member into the actuating pin of the rupturing device 16a to rupture the rupture disc of the pressurized cylinder 16b. The current pulse has a pulse duration of about 10 ms. Moreover, the current pulse preferably defines a magnitude based on the number of actuating devices or PADs coupled to the actuating circuit. More preferably, the actuating circuit is configured with a current pulse magnitude of about 3 Amps DC for the actuation of more than four PADs and more preferably five PADs of the releasing circuit of system 10. The five PADs 18 preferably define a series connected of actuating devices defining a total load on the actuating circuit of about 9 Ohms. To provide the pulse current, the preferred actuating circuit includes a current source in the form of a releasing capacitor charged to a sufficient voltage to provide sufficient current, i.e., 3 Amps, over at least two current pulses. In one particular embodiment the releasing capacitor is charged to 40 Volts before discharge of the 3 Amps of current pulse. The number of PADs or load may be greater than five provided the current pulse magnitude is proportionally and more preferably incrementally increased along with a sufficient increase in the charging voltage of the source capacitor to provide the requisite current over at least two current pulses.

Referring again to FIG. 3A, shown is an exemplary actuating circuit 80 that overlaps or is coupled to a portion of the ground fault detection circuit 60. The actuating circuit 80 includes a releasing capacitor C35, which serves as a current source for the releasing circuit of the system 10. The releasing capacitor C35 preferably has a storage capacity of about 3300 microfarad (μF), which is preferably charged to 40 Volts by an external power source. Alternatively, the releasing capacitor C35 may be charged by an internal source, such as for example a supercapacitor, i.e., electric double-layer capacitor (EDLC) or a vehicle battery, upon a releasing signal from the detection circuit of the system to the preferred 40 volts.

Referring again to FIG. 3A, the actuating circuit 80 further includes the mini-DIN J10 for output of the preferred actuating current pulse through the output bus 26 to each of the PADs 18 of the system 10. Formed between the releasing capacitor C35 and the mini DIN J10 is a current limiting circuit which preferably limits the actuating current pulse to no more than 3 Amps. The current limiting circuit includes a first resistor R52 for receiving a releasing signal ("PAD_Release") from the microprocessor of the ICM 20 or releasing module 70. Accordingly, the actuating circuit 80 may be embodied in the internal circuitry of the ICM 20 or a releasing module 70. When the microcontroller gives the command for release, the "PAD_Release" line is pulled from ground to Vcc (3.3 Volts). This turns transistor Q12 on so as to saturate it (Vce<100 mV) and the releasing voltage C35 is dropped across R43 and R51. This makes a source to gate voltage (−Vgs) at transistor Q10 sufficiently large so as to conduct from source to drain and carry current. But as the current from source to drain builds from zero it produces a voltage across resistor R40 in proportion to it. As source current increases, transistor Q11 will start to turn on, because its emitter-base junction is connected across resistor R40, and the emitter to base voltage is approximately 0.7V. When transistor Q11 turns on, collector current starts to flow and this raises the voltage on the gate of transistor Q10 with respect to ground, which reduces the gate to source voltage |−Vgs|, which leads to a reduction in conductivity from source to drain. The current output has a ceiling of approximately 0.7V/0.18.Ω, which is 3.9 A. The value of the "ceiling" varies inversely with respect to the resistor R40.

Figure 6:
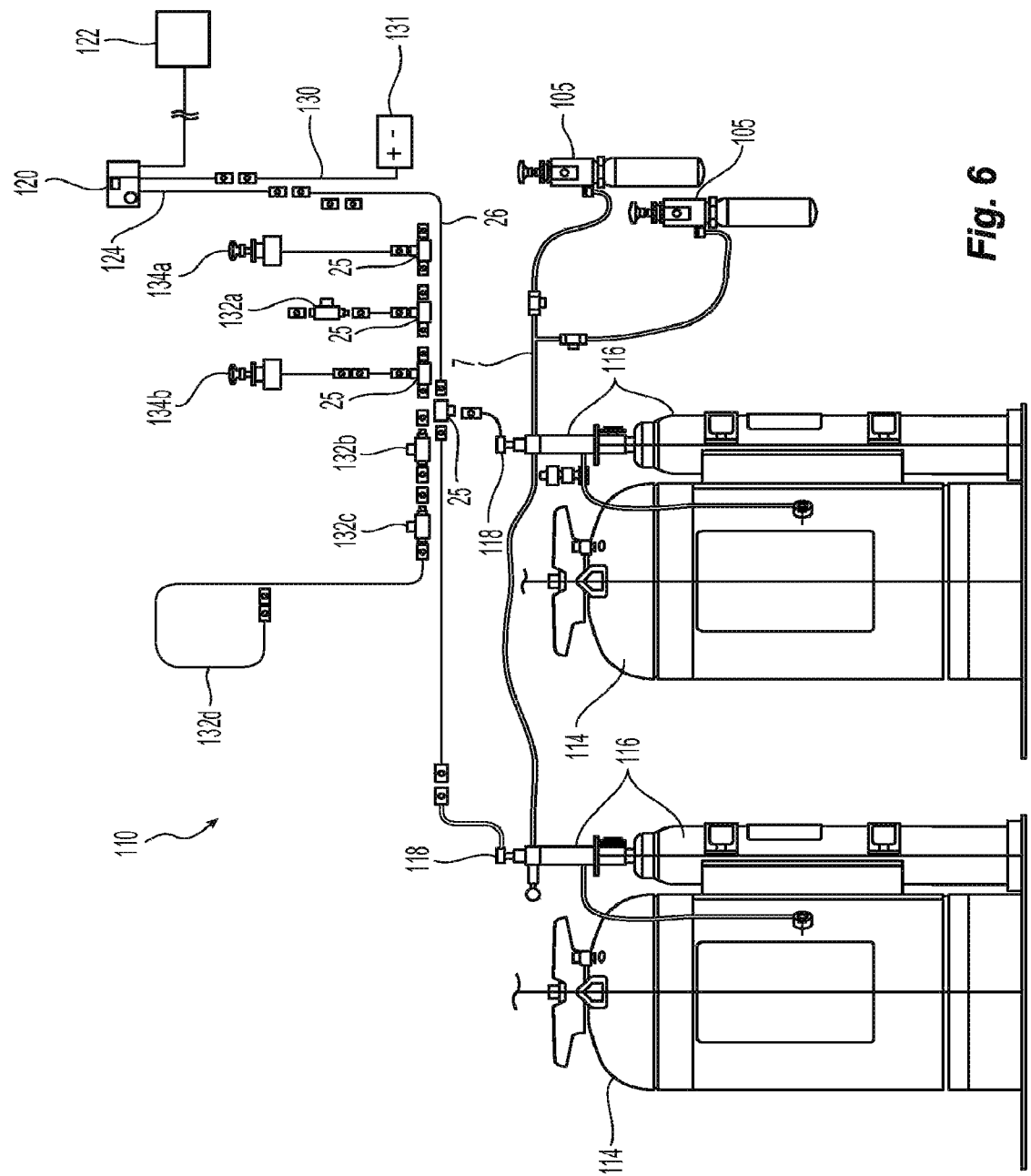
FIG. 6 is a schematic illustration of another embodiment of a fire suppression system having one input bus and one output bus.

The ability to interconnect and expand system components with a central controller over one or more input and output bus lines provides for fire suppressions systems of varying complexity. In one particular embodiment shown schematically in FIG. 6, the system 100 includes a controller 120, an interface display 122, a first input bus 124 with at least one fire detection device 132 and more preferably at least three spot thermal detectors 132a, 132b, 132c, and a linear wire detector 132d; however, it should be understood that the number or type of devices 132 could be varied. The first input bus 124 further preferably includes at least one manual actuating device 134 and more preferably at least two manual actuating devices 134a, 134b. The system 100 further includes an output bus 124 with at least one actuation device and more preferably two PADs 118, each coupled to a pressurized cylinder assembly 116 for discharge of a fire fighting agent.

Figure 7:
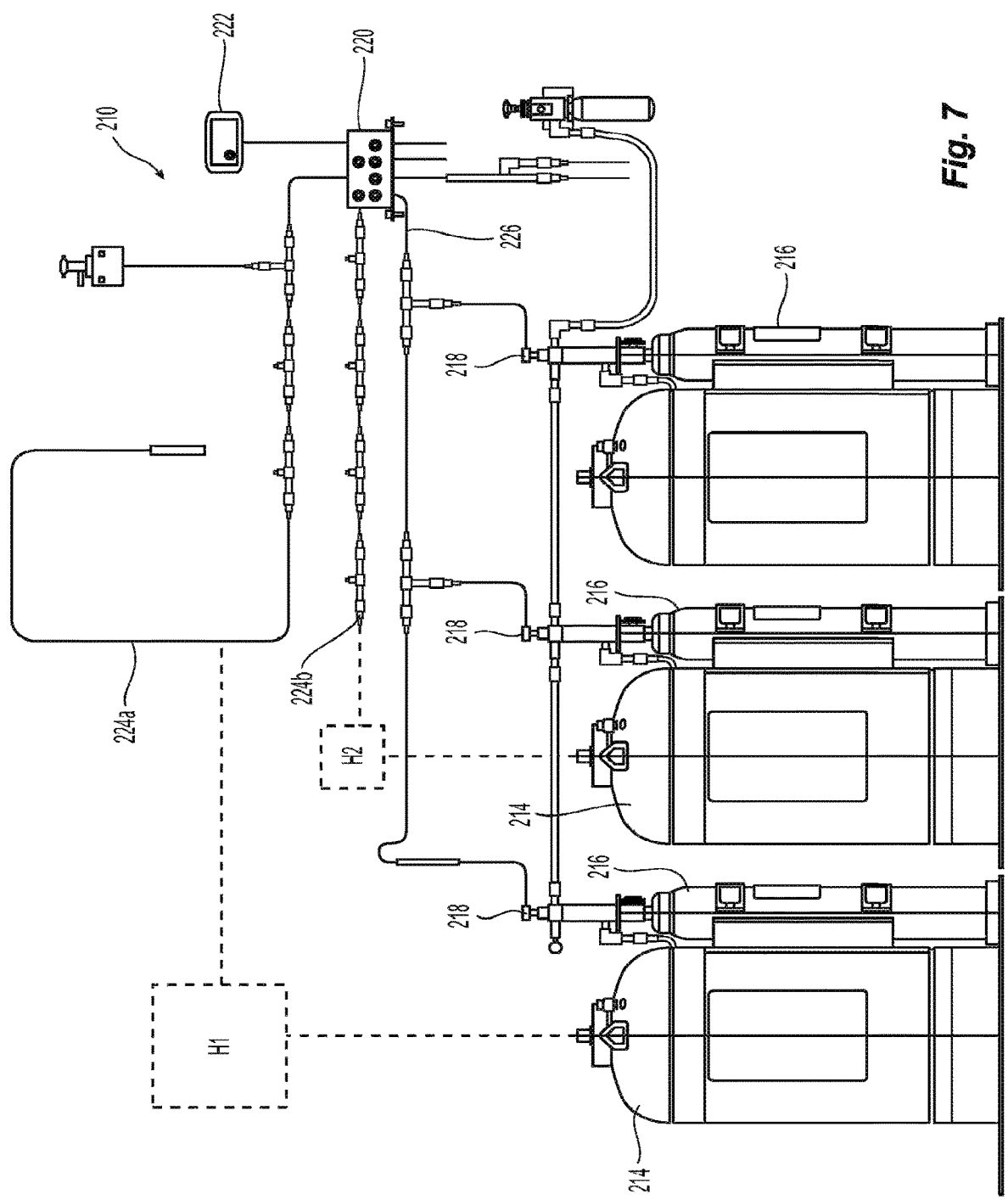
FIG. 7 is a schematic illustration of another embodiment of a fire suppression system having two input buses and one output bus.

Another embodiment of the fire suppression system can be configured with at least two input bus lines which can protect more than one hazard. Shown schematically in FIG. 7 is the system 210 includes a controller 220, an interface display 222, a first input bus 224a and at least a second input bus 224b, each input bus having a plurality of fire detection devices 232 and manual actuating devices 234. In one aspect of the preferred system 210, the first and second input buses 224a, 224b are configured for respectively protecting first hazard H1 and at least second hazard H2. In one aspect, first and second hazard can define different zone, areas or occupancies of a vehicle being protected. The system 210 further includes an output bus 226 with a plurality of actuation devices 205, 218 and more preferably a plurality of PADs 218, each coupled to a pressurized cylinder assembly 216 for discharge of a fire fighting agent for protection of the first hazard H1 and at least the second hazard 2. Accordingly, two or more input buses provide one method of configuring the preferred fire suppression system for protecting separate hazards that may have different detection and/or actuation requirements for protection of the individual hazards.

Figure 8:
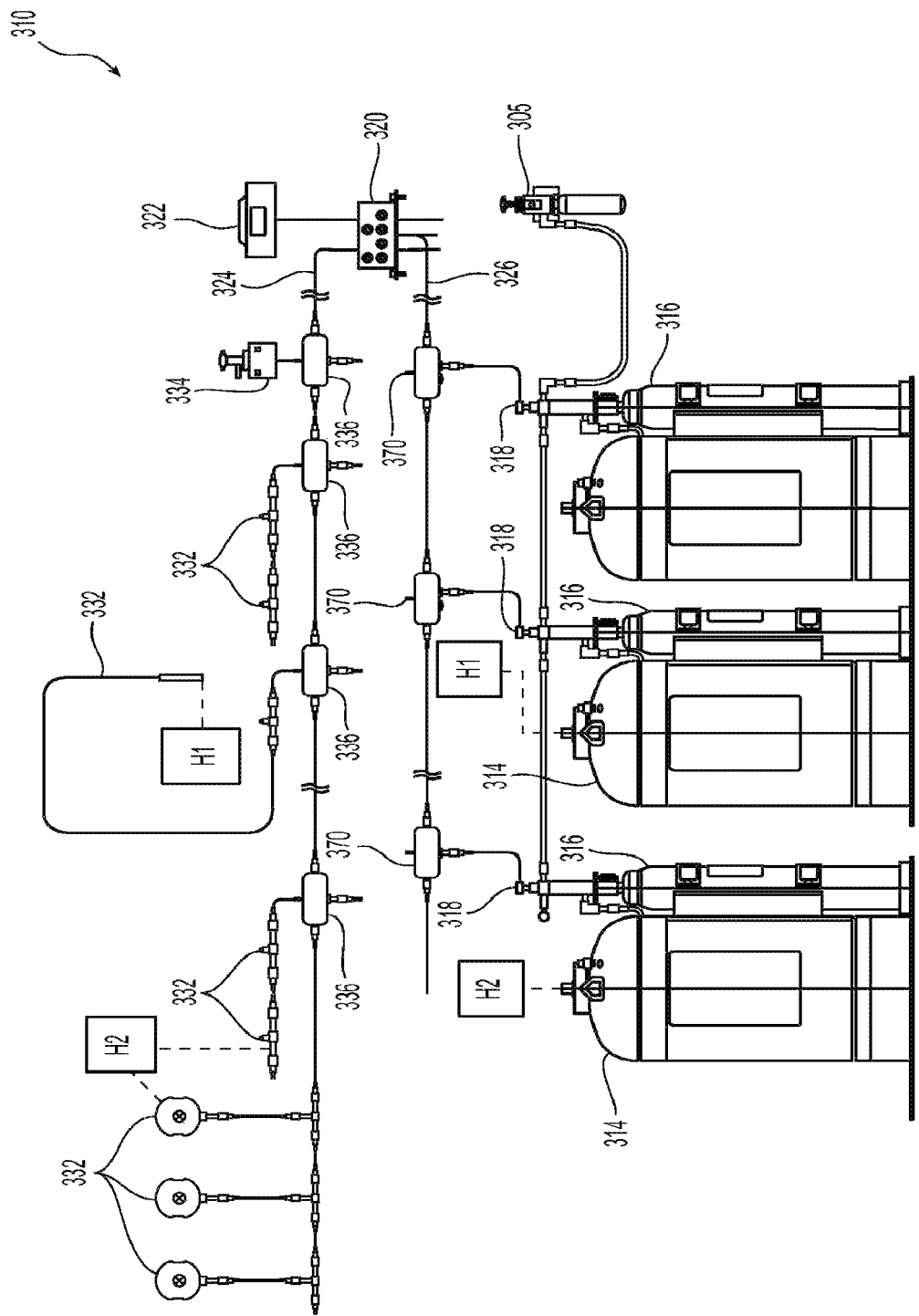
FIG. 8 is a schematic illustration of another embodiment of a fire suppression system using the modules of FIGS. 4 & 5.

Shown schematically in FIG. 8 is another embodiment of fire suppression system 310 that incorporates an input bus 324 and an output bus 326 with each bus respectively including one or more detection and releasing modules as previously described. The system 310 includes a controller or ICM 320, an interface display 322, an input bus 324 having a plurality of detection devices 332 and/or manual actuating devices 334 interconnected by one or more detection modules 336 to the ICM 320. The system 310 further preferably includes with one or more actuation devices 305, 318 and more preferably a plurality of PADs 318 interconnected by one or more of release modules 370 to the ICM 320.

The microprocessors in each of the individual detection modules 336 can be programmed separately to set the detection parameters for the detection device(s) 332 associated with the detection module 336. In another preferred configuration of the suppression system 310, separate detection module and device combinations 336, 332 can be configured or programmed to provide fire detection to different hazards requiring different detection parameters. In another preferred configuration of the suppression system 310, separate detection module and device combinations 336, 332 can be configured or programmed to provide fire detection to different hazards H1, H2 requiring different detection parameters. In another preferred configuration of the suppression system 310, separate release module and actuating device combinations 370, 318 can be configured or programmed to provide fire detection to different hazards H1, H2 requiring different suppression parameters, e.g., actuating sequence or pattern. Accordingly, a preferred fire suppression system 310 with programmable modules 336, 370 provides another arrangement for protection of separate hazards that may have different or variable detection and/or actuation requirements to address a fire in the individual hazards.

In order to configure a preferred fire suppression system for protection of one or more hazards, the system may be programmed. With reference to FIG. 1, the ICM 20 may include an input device, i.e., a toggle switch or alternatively the ICM may be coupled to a separate user interface for program input, such as for example, the one or more accompanying display device 22. Alternatively, the ICM may include wireless communication capabilities, a USB or other port 41, as seen in FIG. 2, for connection to a computer, external media or other input device through which a program, system history, customized settings or firmware may be entered, uploaded or downloaded. In one preferred embodiment, the ICM can be configured to program the detection or actuating devices 32, 34 and or modules 36, 70 respectively disposed on the input and output buses. In another aspect, the ICM 20 may include or be coupled to one or more relay and/or canbus modules 43 for communication with a subsystem of a vehicle, e.g., vehicle electronics using J1939 communication protocol or an engine compartment to begin for example, vehicle shut down in the event of a fire. The relays can be programmed based on the state of the ICM 20, detection module or release module status. Accordingly, exemplary device programming, for example, can set threshold levels, time delays, discharge sequences and patterns, vehicle system parameters and/or other fire suppression system parameters to provide for customized detection and actuation for a particular hazard. Accordingly, customized programming of the detection device can provide for protection of multiple and variable hazards.

Figures 9A, 9C:
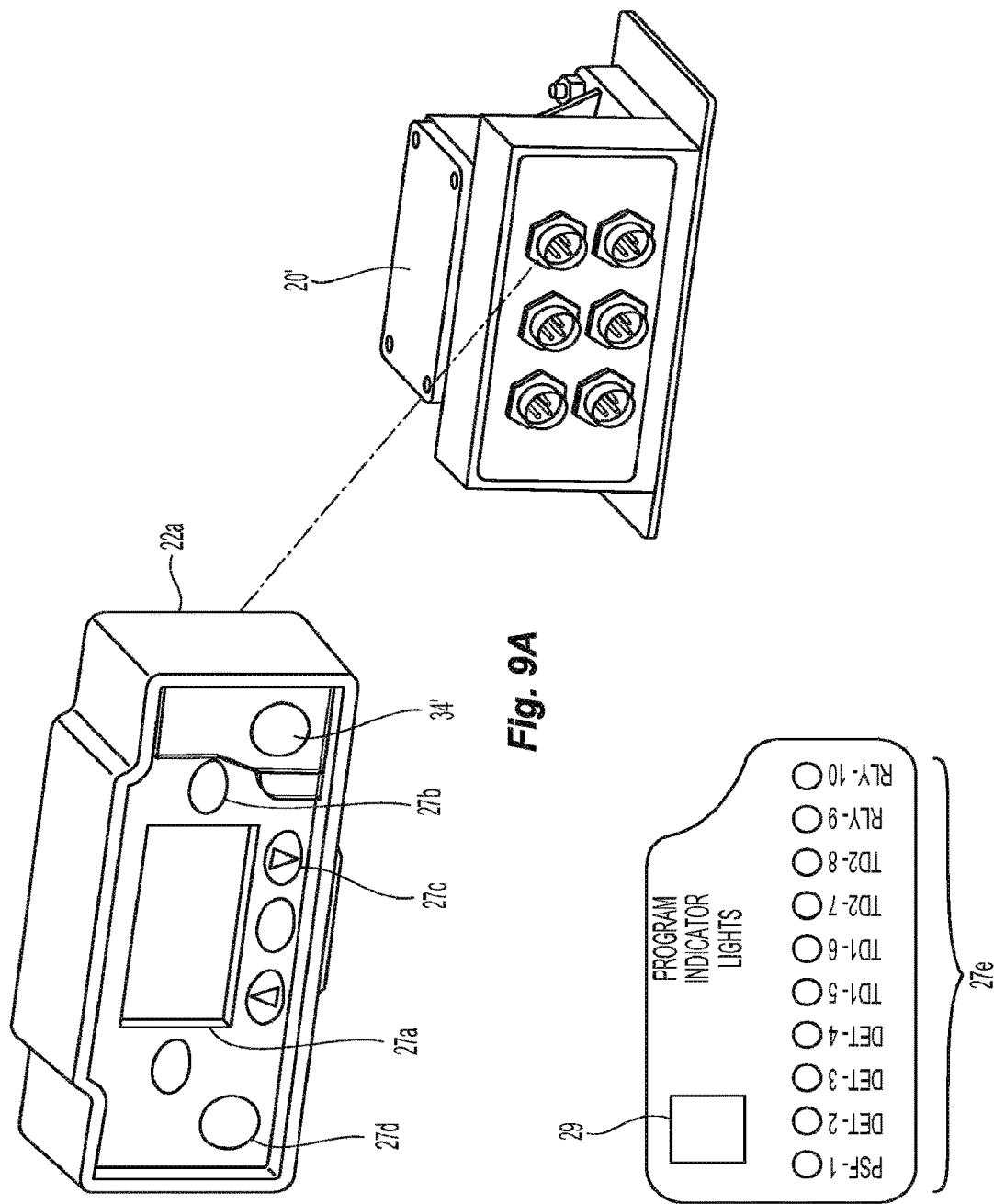
FIG. 9A are interface display devices for use with the system of FIG. 8
FIG. 9C is another embodiment of interface display device.
Figure 9B:
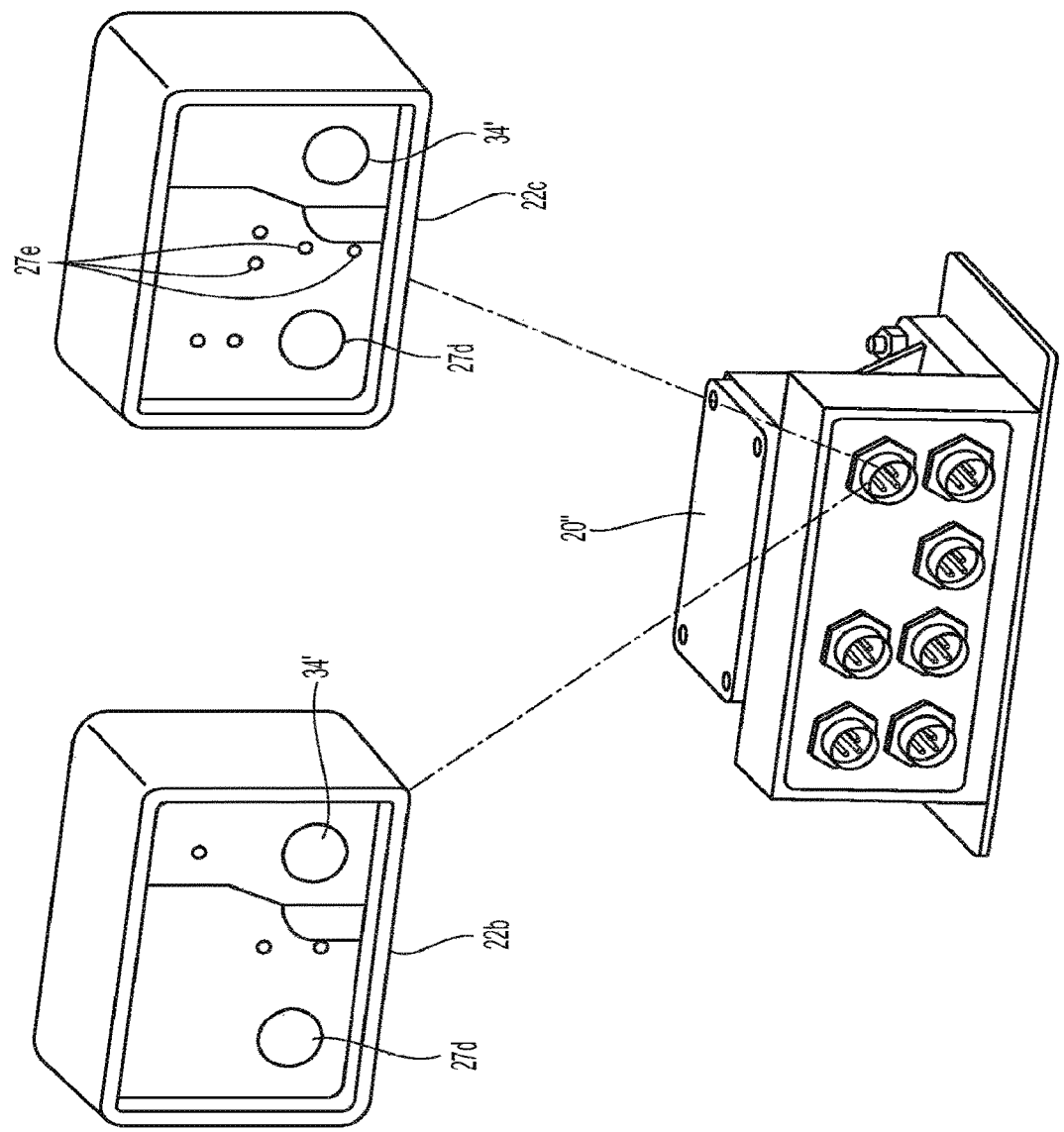
FIG. 9B are alternate interface display devices for use with the systems of FIGS. 6 & 7.

As described, the preferred systems include a display interface to monitor, operate and preferably program the ICM and/or the components, i.e., modules/devices, disposed along the input and output buses. In one particular aspect, the display provides visual indication of the status of the input and output buses including, e.g., indication of: a normal state, ground state, open circuit, manual release. Moreover in another aspect, the preferred display is coupled to the ICM to provide for programming and operational input. For example in the display devices 22a, 22b, 22c of FIGS. 9A and 9B, the display 22a includes visual indicators and/or visual displays 27a that are coupled with user input devices. As shown, the display devices 22a, 22b, 22c can include for example, push buttons 27b, toggle switches, and/or directional buttons 27c in order to scroll, select, edit, reset and/or input, etc. operational parameters of the system and its components. In one particular aspect, the interface display includes a manual actuating button 34' to send an actuating signal to the ICM 20 to relay a corresponding manual actuation signal to the actuation device or PAD 18 on the output bus 26. The interface display further preferably includes a silence button 27d to silence the alarm for a defined period of time, for example, two hours before the alarm re-notifies system personnel of an unresolved issue. In one particular aspect, the visual indicators of the interface display include LEDs 2e which indicate the status of system components using, for example, a binary indicator, i.e., on-off. Alternatively, the LEDs may use a color scheme to indicate the status of a system component, i.e., green—normal status, yellow—fault, red—detection/alarm condition. Shown in FIG. 9C is another embodiment of a LED display 27e in combination with toggle switch 29 which can be used to enable and identify detection devices, time delays and/or power supplies. In addition or alternatively, the interface display 27a of FIG. 9A may use text and/or dynamic or static images to visually indicate the system status. For example, the display may use pictures or icons as the visual indicators.

Figure 10C:
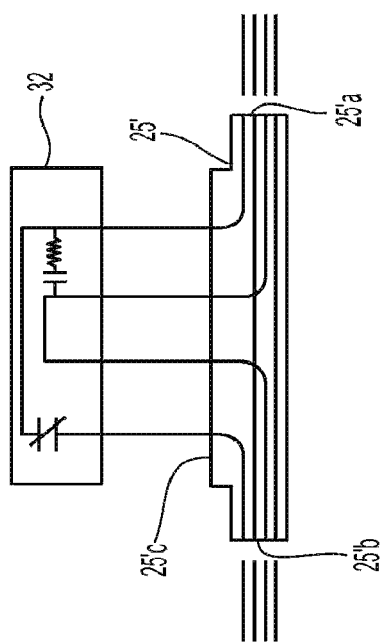

As described, the components and more particularly the devices of the input bus are preferably interconnected by wire or cable and connectors 25, as seen for example, in FIG. 1. In one particular system embodiment, the connection cable carries control, power, data and/or sensing signals between the detection devices and the ICM. A preferred connector 25' is provided for interconnecting segments of the connection cable so as to define a main bus of power for use by the devices of the input bus. One particular embodiment of a connector 25' is substantially T-shaped having a first end 25'a, a second end 25'b and an intermediate connector end 25'c extending between the first and second end. The preferred connector includes at least one, and more preferably four internal wire(s), which extend from the first end 25'a to the intermediate connector 25'c and to the second end 25'b. With the first end 25'a of the connector coupled to an electrical signal defining an operating voltage, the internal wire of the preferred connector 25' has the same voltage at each of its first 25'a, second 25'b and intermediate ends 25'c. Accordingly, connection wire coupled to the second end 25'b of the preferred connector 25' receive, the same input voltage as is provided at the first end 25'a of the connector. In the exemplary embodiments of FIGS. 10A-10C, a device, such as for example, a sensing device 32 may engage the intermediate connection end 25'c such that the device 32 receives the signal at the same voltage that is provided at the first end 25'a of the connector 25'. The preferred connector 25' therefore provides main bus voltage along the length of the input bus.

Figure 11:
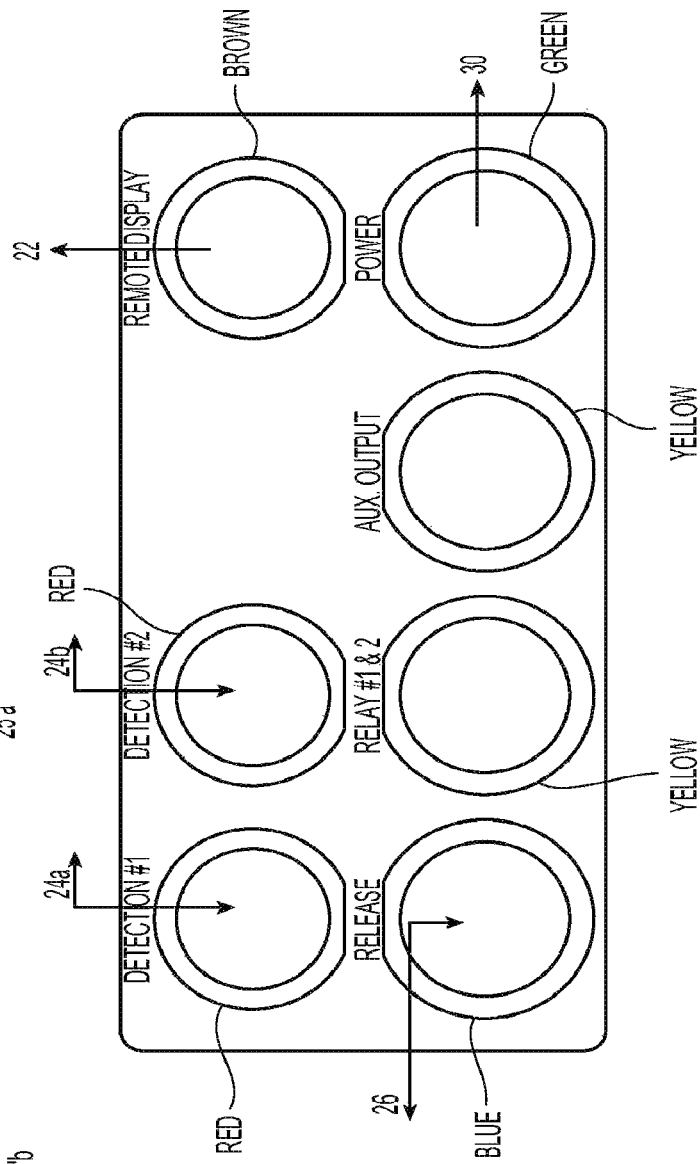
FIG. 11 is a preferred embodiment of a terminal connector of a controller used in the system of FIG. 7.

In yet another aspect of the system connections, a color scheme is employed to facilitate proper interconnection between system components. For example as seen in FIG. 11, the ICM 20 may include connection ports to the various buses, i.e., input bus 24, output bus 26, power supply bus, etc. for engaging one or more connection cables to the input, output bus and/or power supplies. The ICM 20 may include a colored coded face plate to insure proper connection of the connection cables having terminal connectors at their ends which may include correspondingly or similarly colored plastic overlays connectors for engaging the end of the connection cable. The use of one or more color schemes facilitates installation of the system. Moreover, the connection cables of a preferred suppression systems can be jacketed within a harness that distinguishes it from other cables to prevent tampering or accidental disconnection. For example, the connection system of the cables can be jacketed in a red harness.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A vehicle fire suppression system comprising:
   a centralized controller;
   at least one input bus coupled to the centralized controller, the input bus providing for connecting analog and digital devices to the centralized controller;
   at least one output bus coupled to an extinguishment supply and an actuating device for releasing extinguishment from the extinguishment supply, the actuating device being coupled to the centralized controller; and
   a manual actuating device coupled to the input bus for communication with the centralized controller to electrically signal the actuating device on the output bus to provide for manual actuation via an electrical signal,
   wherein the centralized controller is a programmable controller including internal circuitry to detect the status of at least one of the input bus and output bus, further comprising a fire detection circuit coupled to the at least one input bus, the internal circuitry detecting the status of the at least one input bus so as to discern between: a fault condition, a sensed detection, and a manual release along the fire detection circuit depending upon a single variable resistance in the internal circuitry of the programmable controller; and
   wherein the fault condition corresponds to a first range of resistance values of the variable resistance, wherein the sensed detection corresponds to a second range of resistance values of the variable resistance, and wherein the manual release corresponds to a third range of resistance values of the variable resistance.

2. The system of claim 1, wherein the at least one input bus includes at least one fire detection device, the at least one fire detection device being one of an analog or digital device.

3. The system of claim 2, wherein the at least one fire detection device includes one of: (i) a spot thermal detectors; (ii) a linear detection wire; (iii) optical sensor; and (iv) a linear pressure detector.

4. The system of claim 2, wherein the at least one fire detection device is an analog device coupled to a detection module for digital communication with the centralized controller.

5. The system of claim 1, wherein the internal circuitry detects the status of the output bus, the output bus including a release circuit, the internal circuitry includes a fault detection circuit for the release circuit, the fault detection circuit including:
   a first resistor, a first diode, a mini DIN connector, a second diode and a third diode in series with the second diode and coupled to ground, the mini DIN connector being coupled to the at least one output bus and at least one actuating device, the programmable controller evaluating a detection voltage at the mini DIN connector to determine if there is a ground fault in the release circuit, the system including a power source providing a sensing current to define the detection voltage, the power source being grounded to the chassis of the vehicle.

6. The system of claim 1, wherein the input bus includes a plurality of interconnected cables, the interconnected cables including a linear detection wire.

7. The system of claim 6, wherein the interconnected cables form a closed circuit with the centralized controller, the input bus including a branch terminator at the end of the linear detection wire.

8. The system of claim 1, wherein the centralized controller is a programmable controller including internal circuitry to detect the status of at least one of the input bus and output bus, wherein detecting the status of the at least one input bus includes detecting one or more of: a normal state, ground state, an open circuit, and a manual release.

9. The system of claim 8, wherein the internal circuitry includes a first portion coupled to the at least one input bus, a second portion coupled to the at least one output bus, a third portion for output to a display or audio device and a fourth portion coupled to a power bus.

10. The system of claim 1, wherein the fault detection circuit includes a first resistor, a first inductor, a mini DIN connector, a second inductor and a second resistor coupled to ground; the mini DIN connector being coupled to the at least one input bus to define a path for a sensing signal through the first resistor and the first inductor, out the mini-DIN connector, through the at least one input bus and fire detection circuit and back through the mini-DIN connector, through the second inductor and through the second resistor, the programmable controller evaluating the voltage across second resistor to determine a fault in the fire detection circuit.

11. The system of claim 8, wherein the internal circuitry includes a fault detection circuit.

12. The system of claim 1, wherein the fault detection circuit includes a pair of terminals, the programmable controller evaluates the voltage across the terminals to determine a resistance value across the terminals, the resistance values defining the state of the fire detection circuit.

13. The system of claim 1, further comprising a fire detection circuit and a detection module to couple the fire detection circuit to the centralized controller, the detection module having internal circuitry to detect the status of the fire detection circuit including discerning between: a fault condition, a sensed detection, and a manual release along the fire detection circuit.

14. The system of claim 13, wherein the internal circuitry includes a fault detection circuit.

15. The system of claim 14, wherein the fault detection circuit includes a first resistor, a first inductor, a mini DIN connector, a second inductor and a second resistor coupled to ground; the mini DIN connector being coupled to the at least one input bus to define a path for a sensing signal through the first resistor and the first inductor, out the mini-DIN connector, through the at least one input bus and fire detection circuit and back through the mini-DIN connector, through the second inductor and through the second resistor, the detection module evaluating the voltage across second resistor to determine a fault in the fire detection circuit.

16. The system of claim 15, wherein the fault detection circuit includes a pair of terminals, the programmable controller evaluates the voltage across the terminals to determine a resistance value across the terminals, the resistance value defining the state of the fire detection circuit.

17. The system of claim 1, further comprising releasing circuit and a releasing module to couple the releasing circuit to the centralized controller, the releasing module having internal circuitry to detect a fault in the releasing circuit, the internal circuitry including:
a first resistor, a first diode, a mini DIN connector, a second diode and a third diode in series with the second diode and coupled to ground, the mini DIN connector being coupled to the at least one output bus and at least one actuating device, the programmable controller evaluating a detection voltage at the mini DIN connector to determine if there is a ground fault in the releasing circuit, the system including a power source providing a sensing current to define the detection voltage, the power source being grounded to the chassis of the vehicle.

18. The system of claim 1, further comprising a display device coupled to the centralized controller, the display device having a housing having an outer surface defining an opening and an internal wall to define a chamber in communication with the opening, the internal wall including an inclined surface to define taper of the chamber in the direction of the opening to provide a drain, the chamber being separated by a sounding disc.

19. A vehicle fire suppression system comprising:
an input bus having a plurality of detection fire detection devices to define a fire detection circuit;
a power supply;
a centralized controller coupled to the input bus and the power supply; and
a monitoring circuit coupled to the centralized controller to discern between: a fault condition, a sensed detection, and a manual release along the fire detection circuit depending upon a single variable resistance in the monitoring circuit; and
wherein the fault condition corresponds to a first range of resistance values of the variable resistance, wherein the sensed detection corresponds to a second range of resistance values of the variable resistance, and wherein the manual release corresponds to a third range of resistance values of the variable resistance.

20. The system of claim 19, wherein the second range of resistance values and the third range of resistance values are separated from one another by a dead range of resistance values of the variable resistance.

21. The system of claim 19, wherein the monitoring circuit includes a first resistor, a first inductor, a mini DIN connector, a second inductor and a second resistor coupled to ground; the mini DIN connector being coupled to the at least one input bus to define a path for a sensing signal through the first resistor and the first inductor out the mini DIN connector, through the at least one input bus and fire detection circuit and back through the mini-DIN connector, through the second inductor and through the second resistor, the centralized controller evaluating the voltage across second resistor to determine a fault in the fire detection circuit.

22. The system of claim 21, wherein the monitoring circuit includes a pair of terminals, the centralized controller evaluates the voltage across the terminals to determine a resistance value across the terminals, the resistance values defining the state of the fire detection circuit.

23. The system of claim 19, further comprising a detection module to couple the input bus to the centralized controller, the detection module including the monitoring circuit to detect a fault in the fire detection circuit.

24. The system of claim 23, wherein the monitoring circuit includes a first resistor, a first inductor, a mini DIN connector, a second inductor and a second resistor coupled to ground; the mini DIN connector being coupled to the at least one input bus to define a path for a sensing signal through the first resistor and the first inductor out the mini-DIN connector, through the at least one input bus and fire detection circuit and back through the mini-DIN connector, through the second inductor and through the second resistor, the detection module evaluating the voltage across second resistor to detect the fault in the fire detection circuit.

25. The system of claim 24, wherein the monitoring circuit includes a pair of terminals, the centralized controller evaluates the voltage across the terminals to determine a resistance value across the terminals, the resistance values defining the state of the fire detection circuit.

26. The system of claim 19, further comprising a detection module coupling the fire detection circuit to the centralized controller, the detection module being programmable to detect a particular hazard.

27. The system of claim 19, wherein the input bus includes a first input bus protecting a first hazard and at least a second input bus protecting a second hazard different than the first hazard.

28. A vehicle fire suppression system comprising:
an output bus having a plurality of actuating devices and at least one manual actuating device to define a releasing circuit;
a power supply; and
a centralized controller coupled to the output bus and the power supply; and
a fault detection circuit to detect a fault in the releasing circuit, the fault detection circuit including a first resistor, a first diode, a mini DIN connector, a second diode and a third diode in series with the second diode and coupled to ground, the mini DIN connector being coupled to the at least one output bus and at least one actuating device, the centralized controller evaluating a detection voltage at the mini DIN connector to determine if there is a ground fault in the releasing circuit, the system including a power source providing a sensing current to define the detection voltage, the power supply being grounded to the chassis of the vehicle, wherein the centralized controller is a programmable controller including internal circuitry to detect the status of at least one of the input bus and output bus, further comprising a fire detection circuit coupled to the at least one input bus, the internal circuitry detecting the status of the at least one input bus so as to discern between: a fault condition, a sensed detection, and a manual release along the fire detection circuit depending upon a single variable resistance in the internal circuitry of the programmable controller; and wherein the fault condition corresponds to a first range of resistance values of the variable resistance, wherein the sensed detection corresponds to a second range of resistance values of the variable resistance, and wherein the manual release corresponds to a third range of resistance values of the variable resistance.

29. The system of claim 28, comprising at least one releasing module to couple the output bus to the centralized controller, the releasing module including the fault detection circuit to detect a ground fault.

30. The system of claim 29, wherein the at least one releasing module is coupled to a plurality of actuating devices, the releasing module including internal circuitry for selective actuation of each of the plurality of actuating devices.

31. The system of claim 30, wherein the plurality of actuating devices each include a protracted actuation device (PAD) and a pressurized cylinder, the plurality of cylinders including five to ten cylinders.

32. The system of claim 28, further comprising an actuating circuit, the actuating circuit providing for simultaneous or sequential actuation of the plurality of actuating devices.

33. The system of claim 28, further comprising an actuating circuit including a releasing capacitor to provide a current source for the releasing circuit, the releasing capacitor being charged by one of: an external power source, an internal source, or a vehicle battery, wherein the actuating circuit includes the mini-DIN connector for output of an actuating current pulse through the output bus to each of the plurality of actuating devices and a current limiting circuit having a second resistor.

* * * * *